United States Patent
Endo et al.

(10) Patent No.: US 11,428,852 B2
(45) Date of Patent: Aug. 30, 2022

(54) REFLECTION SUPPRESSION SEGMENT HAVING INCLINED SURFACES, DISPLAY, AND METHOD FOR VERIFYING DISPLAY

(71) Applicant: TOPPAN PRINTING CO., LTD., Tokyo (JP)

(72) Inventors: Hiroyuki Endo, Tokyo (JP); Toshiki Toda, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 190 days.

(21) Appl. No.: 16/751,176

(22) Filed: Jan. 23, 2020

(65) Prior Publication Data

US 2020/0158923 A1     May 21, 2020

Related U.S. Application Data

(63) Continuation of application No. PCT/JP2018/028217, filed on Jul. 27, 2018.

(30) Foreign Application Priority Data

Jul. 28, 2017    (JP) .............................. JP2017-146422

(51) Int. Cl.
     *B42D 25/22*      (2014.01)
     *G01M 11/02*      (2006.01)
     (Continued)

(52) U.S. Cl.
CPC ............ *G02B 5/0215* (2013.01); *B42D 25/22* (2014.10); *G01M 11/0207* (2013.01);
(Continued)

(58) Field of Classification Search
CPC ............ B42D 25/20–30; B42D 25/324; B42D 25/351; B42D 25/425; B42D 25/45;
(Continued)

(56) References Cited

U.S. PATENT DOCUMENTS 6,695,905 B2    2/2004    Rozumek et al.
10,427,368 B2   10/2019   Tompkin et al.
(Continued)

FOREIGN PATENT DOCUMENTS

DE    10 2010 049 600 A1    1/2012
FR         2942811 A1    9/2010
(Continued)

OTHER PUBLICATIONS

International Searching Authority, "International Search Report," issued in connection with International Patent Application No. PCT/JP2018/028217, dated Aug. 28, 2018.
(Continued)

*Primary Examiner* — Ryan S Dunning
(74) *Attorney, Agent, or Firm* — Foley & Lardner LLP

(57) ABSTRACT

A dielectric layer comprising an embossed surface and a flat surface which is located at a side opposite to the embossed surface is provided. The plane that approximates the flat surface is the X-Y plane, and the normal direction to the X-Y plane is the Z direction. The embossed surface has inclined surfaces that are inclined with respect to the Z direction, and the inclined surfaces reflect incident light incident on the dielectric layer and emerge reflected light. The elevation angle, which is an angle between the inclined surface and the X-Y plane, is $\alpha$. The refractive index of the dielectric layer is n. These values satisfy Formula (1): $\sin \alpha \leq (1/n) < \sin 2\alpha$.

17 Claims, 11 Drawing Sheets

(51) Int. Cl.
*G02B 5/02* (2006.01)
*B42D 25/21* (2014.01)
*B42D 25/373* (2014.01)

(52) U.S. Cl.
CPC ............ *G02B 5/0284* (2013.01); *B42D 25/21* (2014.10); *B42D 25/373* (2014.10)

(58) Field of Classification Search
CPC ............ B42D 25/373; G01M 11/0207; G02B 1/11–118; G02B 5/021; G02B 5/0215; G02B 5/0221; G02B 5/0231; G02B 5/0263; G02B 5/0284; G09F 3/02; G09F 13/16
See application file for complete search history.

(56) References Cited

U.S. PATENT DOCUMENTS

| | | |
|---|---|---|
| 2008/0231976 A1 | 9/2008 | Commander et al. |
| 2008/0259456 A1 | 10/2008 | Schilling et al. |
| 2009/0127845 A1 * | 5/2009 | Mallol ................ B42D 25/351 283/93 |
| 2017/0308036 A1 * | 10/2017 | Kitamura ............ G03H 1/0011 |
| 2017/0334232 A1 * | 11/2017 | Yashiki ................ B42D 25/328 |

FOREIGN PATENT DOCUMENTS

| | | | |
|---|---|---|---|
| JP | H05-289622 A | 11/1993 | |
| JP | 2008-547040 A | 12/2008 | |
| JP | 4916636 B2 | 4/2012 | |
| JP | 2014-515834 A | 7/2014 | |
| WO | WO-9803350 A1 * | 1/1998 | ............. B42D 15/02 |
| WO | WO-2006/095161 A2 | 9/2006 | |
| WO | WO-2016/075928 A1 | 5/2016 | |

OTHER PUBLICATIONS

International Searching Authority, "Written Opinion," issued in connection with International Patent Application No. PCT/JP2018/028217, dated Aug. 28, 2018.

Extended European Search Report dated Jul. 2, 2020 for corresponding European Patent Application No. 18838237.8.

* cited by examiner

REFLECTION SUPPRESSION SEGMENT HAVING INCLINED SURFACES, DISPLAY, AND METHOD FOR VERIFYING DISPLAY

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2018/028217, filed on Jul. 27, 2018, which is based upon and claims the benefit of priority to Japanese Patent Application No. 2017-146422, filed on Jul. 28, 2017; the disclosures of which are all incorporated herein by reference in their entireties.

TECHNICAL FIELD

The embodiments of the present invention relate to a reflection suppression segment having an optical function that is used to prevent counterfeiting, a display, and a method for verifying the display.

BACKGROUND ART

Securities such as gift certificates and checks, cards such as credit cards, cash cards, ID cards, and certificates such as passports and licenses are provided with a display having visual effects that are different from those of ordinary printed matter formed with ink and the like in order to prevent counterfeiting.

A display having a relief structure on the surface is known as a display having visual effects that are different from those of ordinary printed matter (see, for example, PTL 1). Such a display produces visual effects unique to the display, for example, by utilizing a combination of a spatial distribution of reflected light and observation conditions.

As a method for having a display with similar visual effects, a method for forming a display as an item of printed matter using an ink material where pigments that reflect incident light are dispersed is known (see, for example, PTL 2). Similarly to a display having a relief structure, such a display can also express visual effects different from those of ordinary printed matter, by changing the spatial distribution of reflected light depending on observation conditions of the display.

CITATION LIST

Patent Literature

[PTL 1] JP 2014-515834-A; [PTL 2] JP 4916636-B2.

SUMMARY OF THE INVENTION

Technical Problem

In order to further improve the technique to be resistant to counterfeiting, there is a demand for techniques resistant to counterfeiting having visual effects that are different from conventional techniques, and displays having high designability. These matters are also demanded not only of displays used to prevent counterfeiting, but also of displays used for the purpose of enhancing designability of products to which the displays are attached, or displays where the displays themselves are subjects of observation.

The object of the embodiments of the present invention is to provide a reflection suppression segment, a display, and a method for verifying the display, all of them capable of obtaining novel visual effects.

Solution to Problem

The reflection suppression segment for solving the problem mentioned above is provided with a dielectric layer comprising an embossed surface and a flat surface which is on a side opposite to the embossed surface, wherein a plane that approximates the flat surface is an X-Y plane, a normal direction to the X-Y plane is a Z direction, the embossed surface has inclined surfaces that are inclined with respect to the Z direction, the inclined surfaces reflect incident light incident on the dielectric layer and which emerges as reflected light; and an elevation angle, which is an angle between the inclined surface and the X-Y plane, is $\alpha$, and the refractive index of the dielectric layer is n, which satisfy Formula (1).

$$\sin \alpha \leq (1/n) < \sin 2\alpha \qquad \text{Formula (1)}$$

According to the structure mentioned above, the reflection suppression segment suppresses reflection of light in a direction in which an observer views the reflection suppression segment in plan view with naked eye. On the other hand, the reflection suppression segment reflects light having a predetermined brightness in the direction in which the observer views the reflection suppression element in an oblique direction. As such, when the observer views the reflection suppression segment in plan view, the observer visually recognizes a low-brightness image and the reflection suppression segment as being dark. On the other hand, when the observer views the reflection suppression segment in plan view, the observer visually recognizes the reflection suppression segment as being brighter than a brightness only due to the reflected light. As a result, the reflection suppression segment gives the observer a different impression depending on the observing direction. In other words, new visual effects are obtained by the reflection suppression segment.

In the reflection suppression segment mentioned above, the refractive index of the dielectric layer is greater than 1.0 and less than or equal to 2.0. According to the structure mentioned above, by having the refractive index of the dielectric layer larger than the refractive index of air which is 1.0, when the reflection suppressing segment is surrounded by air, total reflection of incident light incident on the dielectric layer at the interface between the dielectric layer and air without passing through the dielectric layer is suppressed.

In the reflection suppression segment mentioned above, the reflection suppression segment may further include a reflection layer along the inclined surfaces. According to the structure mentioned above, the efficiency of light which is incident on the reflection suppression segment reflecting at the reflection suppression segment is enhanced by positioning a reflective layer along the inclined surfaces.

In the reflection suppression segment mentioned above, the dielectric layer is a first dielectric layer, and the reflection suppression segment further includes a second dielectric layer covering the embossed surface of the first dielectric layer, and the surface on the side opposite to the embossed surface in the second dielectric layer may be flat.

According to the structure mentioned above, by having the second dielectric layer whose surface on the side opposite to the embossed surface is flat, when observed from the side opposite to the first dielectric layer with respect to the second dielectric layer, the Formula (1) mentioned above is applied to the second dielectric layer. Thereby, in both the case where the reflection suppression segment is observed from a side of the first dielectric layer facing away from the second dielectric layer, and the case where the reflection suppression segment is observed from a side of the second dielectric layer facing away from the first dielectric layer, the reflection suppression segment displays an image where brightness in plan view and brightness when viewed obliquely are different from each other.

The display for solving the problem mentioned above is a display provided with a plurality of reflection suppression segments, and each reflection suppression segment is a reflection suppression segment mentioned above. The plurality of reflection suppression segments share one dielectric layer. The flat surface of each reflection suppression segment is included in one flat surface of the dielectric layer, and the embossed surface of each reflection suppression segment is included in one embossed surface in the dielectric layer, when the display is observed from a predetermined fixed point located on a side of the flat surface of the dielectric layer facing away from the embossed surface of the dielectric layer, and located in a direction oblique to the flat surface of the dielectric layer, the plurality of reflection suppression segments include reflection suppression segments having different brightness of reflected light from one another.

According to the structure mentioned above, the display forms an image with different brightness for each reflection suppression segment in the direction when obliquely viewing the display. As such, the display displays a more sophisticated image in an oblique direction of the display as compared with a structure including only one reflection suppression segment.

In the display mentioned above, the plurality of reflection suppression segments have different elevation angles from one another, and thereby, when the display is observed from the fixed point mentioned above, the brightness may be different between the reflection suppression segments.

According to the structure mentioned above, by varying the elevation angle of the inclined surfaces for each reflection suppression segment, light having different brightness from one another is reflected from each reflection suppression segment toward a fixed point located in the oblique direction of the display. Thereby, the display displays an image composed of a plurality of regions having different brightness from one another towards the fixed point.

In the display mentioned above, a direction obtained by projecting a normal direction of the inclined surfaces onto the X-Y plane is the azimuth direction, an angle formed by the azimuth direction and a reference direction on the X-Y plane is the azimuth angle, and the plurality of reflection suppression segments have different azimuth angles, and thereby, when the display is observed from the fixed point, the brightness between the reflection suppression segments may be different.

According to the structure mentioned above, by varying the azimuth angle of the inclined surfaces for each reflection suppression segment, light having different brightness is reflected from each reflection suppression segment towards a fixed point located in the oblique direction of the display. Thereby, the display forms an image of a motif formed from a plurality of regions having different brightness from one another, towards a fixed point.

The display mentioned above includes three or more of the reflection suppression segments arranged along one direction, and the difference obtained by subtracting the elevation angle of the (n+1)th reflection suppression segment from the elevation angle of the nth reflection suppression segment may have a predetermined value.

The display mentioned above includes three or more of the reflection suppression segments arranged along one direction, and the difference obtained by subtracting the azimuth angle of the (n+1)th reflection suppression segment from the azimuth angle of the nth reflection suppression segment may have a predetermined value.

According to each structure mentioned above, as the point from which the display is observed moves, the observer visually recognizes a state in which the portion having high brightness of a reflected light moves along the direction in which the reflection suppression segments are arranged in the display. Thereby, a visual effect more impressive to the observer is imparted to the display.

A method of verifying a display for solving the problem mentioned above is a method of verifying the display, and the method comprises observing the display in a state where a diffuser is stacked on the flat surface of the display, and observing the display in a state where the diffuser is not stacked on the flat surface of the display.

According to the method mentioned above, by stacking the diffuser on the flat surface of the display, reflected light which is reflected to the direction in which the observer views the display obliquely is distributed to the direction in which the observer views the display in plan view. As such, in a state where the diffuser is not stacked on the flat surface, the reflected light is visually perceived by the observer even in the reflection suppression segment mentioned above perceived in black in plan view. Thereby, it is possible to verify the display by the difference between an image displayed by the display observed in a state where the diffuser is not stacked on the flat surface of the display, and an image displayed by the display observed in a state where the diffuser is stacked on the flat surface of the display.

DETAILED DESCRIPTION

Figure 1:
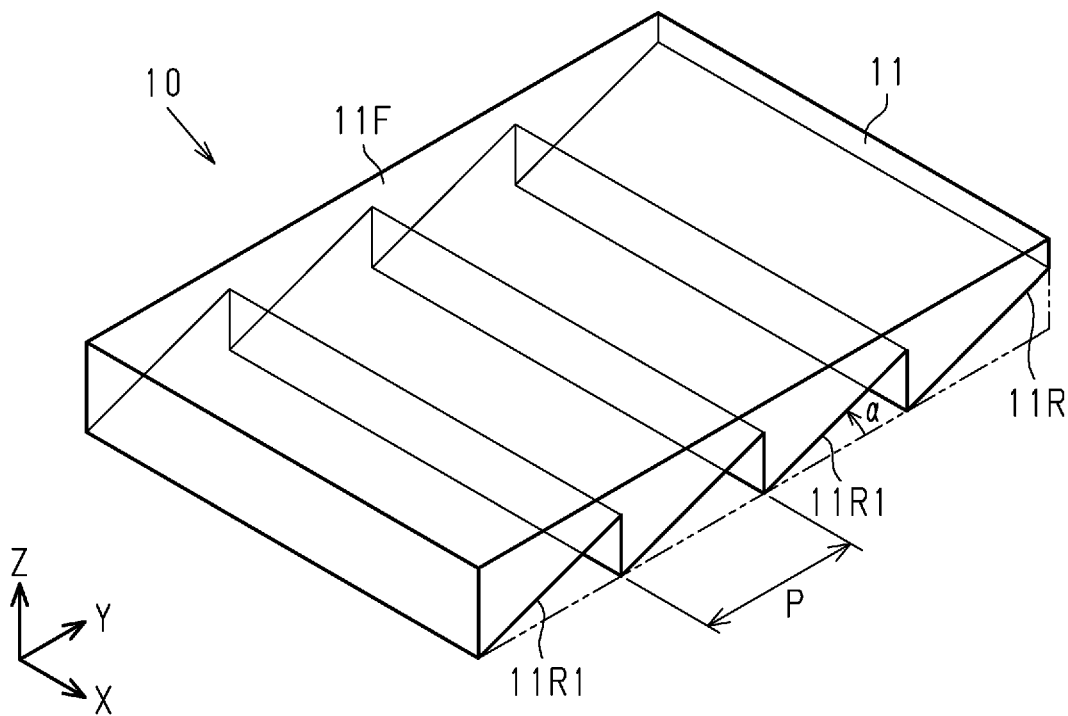
FIG. 1 is a conceptual perspective view of a structure of a reflection suppressing segment according to a first embodiment of the present invention.

With reference to the accompanying Figures, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. Here, the drawings are schematic, and the relationship between thickness and plane size, the ratio of the thickness of each layer, etc., may be different from actual ones. The embodiments described below are merely examples of the configurations for embodying the technical idea of the present invention, and the technical idea of the present invention should not limit the materials, shapes, structures, and the like of the components to those described below. The technical idea of the present invention can be modified in various ways within the technical scope specified by the claims.

The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

First Embodiment of the Present Invention

Figure 2:
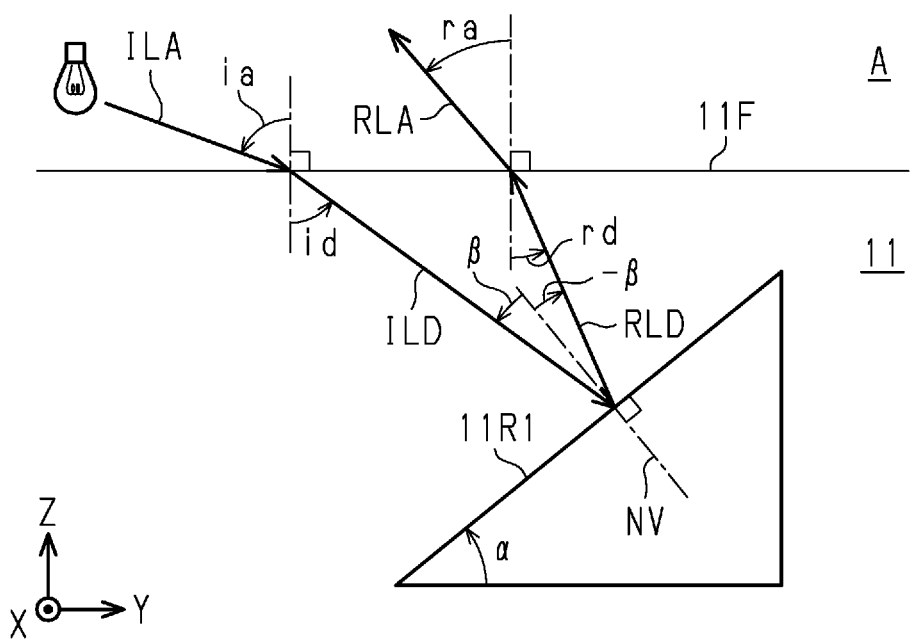
FIG. 2 is a conceptual diagram of an interaction between the reflection suppression segment and light according to the first embodiment of the present invention.

With reference to FIG. 1 and FIG. 2, a first embodiment of the present invention in which a reflection suppression segment is embodied will now be described. Hereinafter, a structure of the reflection suppression segment and an interaction between the reflection suppression segment and light will be described in order.

[Structure of Reflection Suppression Segment]

Structure of the reflection suppression segment will be described with reference to FIG. 1.

As shown in FIG. 1, the reflection suppression segment 10 is provided with a dielectric layer 11. The dielectric layer 11 includes an embossed surface 11R and a flat surface 11F that is a surface on the opposite side to the embossed surface 11R. The dielectric layer 11 may be in contact with air. The flat surface 11F of the dielectric layer 11 may be in contact with air. The flat surface 11F may be an outermost layer of the display. The normal direction in the X-Y plane, which is a plane that approximates the flat surface 11F, is the Z direction. That is, the X direction, the Y direction, and the Z direction are directions orthogonal to one another. The embossed surface 11R has a plurality of inclined surfaces 11R1 inclined with respect to the Z direction. That is, the embossed surface 11R has inclined surfaces 11R1, and the normal direction of the inclined surfaces 11R1 is inclined with respect to the Z direction. The inclined surfaces 11R1 reflect incident light incident on the dielectric layer 11 and which emerges as reflected light. The elevation angle that is the angle between the inclined surfaces 11R1 and the X-Y plane is $\alpha$, and the refractive index of the dielectric layer 11 is n. At this time, the elevation angle $\alpha$ and the refractive index n obey the following Formula (1).

$$\sin \alpha \leq (1/n) < \sin 2\alpha \qquad \text{Formula (1)}$$

Further, the dielectric layer 11 may be a multilayer. When the dielectric layer 11 is a multilayer, the refractive index n of the dielectric layer 11 may be a refractive index n of a dielectric layer including the inclined surfaces 11R1.

According to the reflection suppression segment 10, the reflection suppression segment 10 suppresses reflection of light in the direction in which an observer views the reflection suppression segment 10 in plan view. On the other hand, the reflection suppression segment 10 reflects light having a predetermined brightness in the direction in which the observer obliquely views the reflection suppression segment 10. As such, the observer visually recognizes the reflection suppression segment 10 as being dark when viewing the reflection suppression segment 10 in plan view, whereas the observer visually recognizes the reflection suppression segment 10 brighter due to the reflected light when obliquely viewing the reflection suppression segment 10. As a result, the reflection suppression segment 10 imparts the observer a different impression depending on the observation direction. In other words, new visual effects is obtained by the reflection suppression segment 10.

According to such a reflection suppression segment 10, in the case of performing photometry on the reflection suppression segment 10 using an instrument such as a brightness photometer, when performing photometry on the reflection suppression segment 10 from a perpendicular direction of the reflection suppression segment 10, a remarkably low brightness is obtained, and when performing photometry on the reflection suppression segment 10 from an inclined direction thereof, a higher brightness is obtained by the reflected light. Thereby, it is possible to verify the reflection suppression segment 10 using the results of measuring light reflected from the reflection suppression segment 10.

The flat surface 11F is an approximately flat surface. That is, the flat surface 11F may not be a strict flat surface, and it may be an uneven surface as long as the interaction between the reflection suppressing segment 10 and light described below is obtained. The flat surface 11F may be entirely or partially a mirror surface. The mirror surface has an average roughness (Ra) of 200 nm or less. A part or the whole of the flat surface 11F may be a rough surface. The rough surface has an average roughness (Ra) of greater than 200 nm. A part or the whole of the flat surface 11F may be a mat surface. The mat surface has an average roughness (Ra) in the range of greater than 200 nm and 1 μm or less. Visibility of the mat surface may be improved by reducing the gloss on the flat surface 11F.

A portion of the flat surface 11F may be made into a rough surface by removing or altering a portion of the flat surface 11F with a laser, and by roughening it. A portion of the flat surface 11F may be made into a rough surface by providing transparent printing on the flat surface 11F, and by roughening it. When the flat surface 11F is a mirror surface, it is possible to minimize the reflected light from the inclined surfaces having a specific inclination angle from emerging in a perpendicular direction of the flat surface. When the flat surface 11F is a rough surface, a portion of the reflected light from the inclined surfaces having a specific inclination angle emerges to the perpendicular direction of the flat surface. The flat surface 11F can have a mirror surface and a rough surface. The flat surface 11F can record information as contours of the rough surface. Information to be recorded includes words, numbers, codes, symbols, marks, logos, symbols, signals, and the like.

The dielectric layer 11 has a light transmitting property that transmits incident light incident on the dielectric layer 11. As such, when it is assumed that the reflection suppression segment 10 is surrounded by air, at least a portion of the incident light incident on the dielectric layer 11 is transmitted through the dielectric layer 11 by having the refractive index n of the dielectric layer 11 be larger than 1.0, which is the refractive index of air. Thereby, it is possible to suppress total reflection of the incident light incident on the dielectric layer 11 at the reflecting surface of the dielectric layer 11. These matters are clear from Snell's law. The refractive index of the dielectric layer 11 is preferably greater than 1.0 and 2.0 or less. The refractive index of the dielectric layer 11 is more preferably 1.2 or greater and 2.0 or less.

By having the refractive index of the dielectric layer 11 be greater than the refractive index of air of 1.0, when the reflection suppressing segment 10 is surrounded by air, total reflection of incident light incident on the dielectric layer 11 at the interface between the dielectric layer 11 and an air layer without passing through the dielectric layer 11 is suppressed.

The embossed surface 11R only needs to include at least one inclined surface 11R1, and may include a plurality of inclined surfaces 11R1. In the present embodiment, the plurality of inclined surfaces 11R1 are arranged along the Y direction, but the plurality of inclined surfaces 11R1 may be arranged along at least either one of the X direction or the Y direction.

In the present embodiment, in the plurality of inclined surfaces 11R1 belonging to one reflection suppression segment 10, the elevation angles α are equal to one another and the azimuth angles are equal to each other. The azimuth angle is an angle formed between the azimuth direction at the time the normal line of each inclined surface 11R1 is projected onto the X-Y plane, and the X direction. The X direction is an example of the reference direction. For example, the azimuth angle in FIG. 1 is 270°.

In the reflection suppression segment 10, pitch P, at which the inclined surfaces 11R1 are repeated, is preferably 300 μm or less. Thereby, chances for the observer visually recognizing the individual inclined surfaces 11R1 are suppressed. The pitch P at which the inclined surfaces 11R1 are repeated is preferably 10 μm or greater. Thereby, the reflection suppressing segment 10 does not allow diffracted light to emerge, and thus the reflection suppression segment 10 suppresses emergence of reflected light to a direction toward the observer viewing the reflection suppression segment 10 in plan view.

[Interaction Between Reflection Suppression Segment and Light]

With reference to FIG. 2, the process of deriving Formula (1) mentioned above is described, and the interaction between the reflection suppression segment 10 and light is described.

FIG. 2 shows an enlarged portion of the dielectric layer 11 in a cross-sectional structure along the Y-Z plane of the reflection suppressing segment 10. In FIG. 2, for convenience of illustration, one inclined surface 11R1 in the dielectric layer 11 is shown by one triangle. Hereinafter, the case where the reflection suppression segment 10 is surrounded by air, and an observer observes the reflection suppression segment 10 from the side of the flat surface 11F facing away from the embossed surface 11R (that is, the case where the reflection suppression segment 10 is observed from the flat surface 11F) is described. More specifically, the case of observation from a fixed point included in a plane defined by the azimuth direction and the Z direction of an inclined surface 11R1 included in the embossed surface 11R will be described.

In the reflection suppression segment 10, the flat surface 11F side, facing away from the embossed surface 11R, is visually recognized, so that the brightness of the reflection suppression segment 10 when it is viewed in plan view is different from the brightness thereof when it is obliquely viewed. That is, in the reflection suppression segment 10, by reducing the light reflected towards the normal direction in the flat surface 11F, when an observer views the reflection suppression segment 10 in plan view with naked eye, the observer visually recognizes the reflection suppression segment 10 as a black structure. On the other hand, if the reflection suppression segment 10 emerges reflected light towards a direction obliquely viewing the reflection suppression segment 10, and when the observer obliquely views the reflection suppression segment 10 with naked eye, the observer visually recognizes the reflected light. By setting the elevation angle α of the inclined surfaces 11R1 in the range of Formula (1) mentioned above, the reflection suppression segment 10 may suppress reflection of incident light incident on the reflection suppression segment 10 towards a direction viewing the reflection suppression segment 10 in plan view, and the reflection suppression segment 10 may have a structure where incident light incident on the reflection suppression segment 10 is reflected towards a direction in which the reflection suppression segment 10 is obliquely viewed.

Hereinafter, conditions for suppressing the reflection of the incident light incident on the reflection suppression segment 10 towards a direction in which the reflection suppression segment 10 is viewed in plan view, and the incident light incident on the reflection suppression segment 10 reflecting towards a direction obliquely viewing the reflection suppression segment 10 are described in detail.

Incident light ILA incident on the reflection suppression segment 10 from a direction different from the normal direction in the flat surface 11F is first incident on the dielectric layer 11 having a refractive index n from the flat surface 11F. At this time, the incidence angle of the incident light ILA incident on the dielectric layer 11 from an air layer A is ia, and a refraction angle at which the incident light ILA is refracted at the flat surface 11F is id. Thereafter, the incident light ILD traveling through the dielectric layer 11 is reflected by the inclined surface 11R1, and becomes reflected light RLD. An incidence angle of the incident light ILD to the inclined surface 11R1 and a reflection angle of the reflected light RLD at the inclined surface 11R1 are both β. Reflected light RLD reflected by the inclined surface 11R1 travels through the dielectric layer 11, and it is emerged from the flat surface 11F to the air layer A. An incidence angle of the reflected light RLD from the dielectric layer 11 towards the air layer A is rd, and a refraction angle at which the reflected light RLD is refracted at the flat surface 11F is ra. Finally, light emerging from the reflection suppression segment 10 becomes reflected light RLA traveling through the air layer A.

The flat surface 11F is located at an interface between the air layer A and the dielectric layer 11. In the relationship between the incident light ILA and the incident light ILD, Snell's law may be applied between the incidence angle ia at which light is incident on the dielectric layer 11 from the air layer A, and the refraction angle id at which light refracts at the dielectric layer 11. Similarly, Snell's law also applies to the relationship between the incidence angle rd at which the reflected light RLD is incident on the air layer A from the dielectric layer 11 via the flat surface 11F, and the refraction angle ra of the refracted light RLA refracted at the flat surface 11F. On the inclined surface 11R1, the incidence angle β, which is an angle formed between the incident light ILD and the normal line NV, and the reflection angle β, which is an angle formed between the reflected light RLD and the normal line NV, are equal to each other.

It is assumed that a counterclockwise angle on paper is a positive angle and a clockwise angle on paper is a negative angle. In this case, in the example shown in FIG. 2, the refraction angle id of the incident light ILD is calculated by the following Formula (2) using the elevation angle α which is an angle formed by the inclined surface 11R1 and the X-Y plane, and the incidence angle β. A counterclockwise angle in the paper is an angle from the Y direction to the Z direction, in a region defined by a direction departing away from the intersection of the Y axis and the Z axis in each of the Y direction and the Z direction. A clockwise angle on the paper is an angle from the Z direction to the Y direction, in a region defined by a direction departing away from the intersection of the Y axis and the Z axis in each of the Y direction and the Z direction.

$$id=(\alpha+\beta) \quad \text{Formula (2)}$$

Similarly, the incidence angle rd of the reflected light RLD is calculated by the following Formula (3).

$$rd=(\alpha-\beta) \quad \text{Formula (3)}$$

With reference to FIG. 2, a condition that the reflected light RLA emerging from the reflection suppression segment 10 is toward plan view direction, that is toward the normal direction in the flat surface 11F, and a condition that the reflected light RLA does not emerge to the Z direction will now be described.

Snell's law applies to the relationship between the incidence angle ia of the incident light ILA and the refraction angle id of the incident light ILD. Thus, the following Formula (4) is established.

$$\sin(ia)=n \cdot \sin(id) \quad \text{Formula (4)}$$

Further, the following Formula (5) is derived by substituting the refraction angle id of Formula (4) with Formula (2).

$$\sin(ia)=n \cdot \sin(\alpha+\beta) \quad \text{Formula (5)}$$

Similarly, Snell's law applies to the relationship between the incidence angle rd of the reflected light RLD and the refraction angle ra of the reflected light RLA. Thus, the following Formula (6) is established.

$$\sin(ra)=n \cdot \sin(rd) \quad \text{Formula (6)}$$

Further, the following Formula (7) is derived by substituting the incidence angle rd of Formula (6) with Formula (3).

$$\sin(ra)=n \cdot \sin(\alpha-\beta) \quad \text{Formula (7)}$$

When the reflected light RLA emerges in plan view direction of the reflection suppression segment 10, that is, when the refraction angle ra is 0°, the following Formula (8) is established from the Formula (7).

$$\alpha=\beta \quad \text{Formula (8)}$$

In this case, according to the Formula (2) mentioned above, the refraction angle id is 2α, which is a positive value. Therefore, the Formula (4) mentioned above can be converted into the following Formula (9).

$$\sin(ia)=n \cdot \sin(2\alpha) \quad \text{Formula (9)}$$

Because the maximum value of the left side in Formula (9) is 1, the maximum value of the right side in Formula (9) is also 1. In other words, when the value of the right side of Formula (9) exceeds 1, Snell's law is not met, and therefore an optical path cannot exist between the incident light ILA and the incident light ILD. Therefore, an optical path cannot exist between the incident light ILA and the reflected light RLA, and the reflected light RLA will not emerge. That is, by having the dielectric layer 11 take a structure having inclined surfaces 11R1 that meet the following Formula (10) using the elevation angle α of the inclined surfaces 11R1 and the refractive index n of the dielectric layer, emergence of the reflected light RLA in plan view direction of the reflection suppression segment 10 is suppressed.

$$\sin(2\alpha) > 1/n \qquad \text{Formula(10)}$$

With reference to FIG. 2, the condition that the reflection suppression segment 10 suppresses emergence of the reflected light RLA in plan view direction and the condition that the reflection suppression segment 10 emerges as the reflected light RLA in the oblique direction will be described. The oblique direction is a direction in which the reflection suppression segment 10 is observed from a certain fixed point on a plane determined by the azimuth direction and the Z direction, and a direction not parallel to the Z direction.

Because the maximum value of the left side of Formula (4) is 1, the maximum value of the right side of Formula (4) is also 1. That is, if the relationship between the incident light ILA and the incident light ILD meets the following Formula (11), an optical path exists between the incident light ILA and the incident light ILD.

$$\sin(id) \le 1/n \qquad (11)$$

The following Formula (12) is derived from Formula (2) and Formula (3).

$$id = 2\alpha - rd \qquad (12)$$

As such, the following Formula (13) must be established from Formula (11).

$$\sin(2\alpha - rd) \le 1/n \qquad (13)$$

Because Formula (10), which is a condition for suppressing the emergence of the reflected light RLA in plan view direction of the reflection suppressing segment 10, is already established, the incidence angle rd must be a positive value greater than 0, according to Formula (13).

When the incidence angle rd of the reflected light RLD is a positive value greater than 0, the refraction angle ra of the reflected light RLA is also a positive value greater than 0 according to Formula (6) mentioned above. That is, the reflected light RLA emerging from the reflection suppression segment 10 emerges only in the direction in which an observer obliquely views the reflection suppression segment 10 from a positive angle greater than zero.

As mentioned above, in the reflection suppression segment 10, Snell's law must be applied in order for an optical path to exist between the incident light ILA and the reflected light RLA. When Snell's law is applied, the maximum value of the left side of Formula (5) mentioned above is 1, and the maximum value of the left side of Formula (7) mentioned above is also 1, and therefore the following Formula (14) and Formula (15) are derived.

$$\sin(\alpha + \beta) \le 1/n \qquad (14)$$

$$\sin(\alpha - \beta) \le 1/n \qquad (15)$$

In order for Formula (14) and Formula (15) to be met at the same time, the following Formula (16) must be applied.

$$\sin(\alpha) \le 1/n \qquad (16)$$

In other words, when the inclined surfaces 11R1 of the dielectric layer 11 meet Formula (16), at least one angle β where Formula (14) and Formula (15) are established at the same time exists. Therefore, it is possible for the incident light ILA to emerge from the reflection suppressing segment 10 as the reflected light RLA. As a result, Formula (1) is derived from Formula (10) and Formula (16) mentioned above. The condition that the incident light ILA does not emerge from the reflection suppression segment 10 as the reflected light RLA is a condition for total reflection at the flat surface 11F.

As described above, according to the reflection suppression segment of the first embodiment of the present invention, the effects described below are obtained.

By having the dielectric layer 11 of the reflection suppressing segment 10 meet formula (1), it is possible to suppress reflection of the incident light incident on the reflection suppressing segment 10 in plan view direction of the reflection suppressing segment 10, and allow reflection in the oblique direction. As such, according to the reflection suppression segment 10, new visual effects are obtained in which a darker image is displayed in plan view direction of the reflection suppression segment 10 while a brighter image is displayed in the oblique direction of the reflection suppression segment 10.

Modification of First Embodiment of the Present Invention

The first embodiment mentioned above is implemented with the following modifications.

FIG. 2 illustrates an example in which the elevation angle α of the inclined surfaces 11R1 is a counterclockwise angle when the counterclockwise angle, that is, the angle from the Y direction to the Z direction is a positive angle. Even if the elevation angle α of the inclined surfaces 11R1 is a clockwise angle, it is possible to provide a similar description to the description mentioned above by setting the clockwise angle to a positive angle. That is, when the reflection suppression segment 10 meets Formula (1), similar effects are produced regardless of the azimuth angle of the inclined surfaces 11R1.

The reflection of the incident light ILD at the inclined surface 11R1 may be caused by the difference in refractive index between the dielectric layer 11 and the air layer A as mentioned above, or it may be caused by the reflective layer on the inclined surfaces 11R1.

Figure 3:
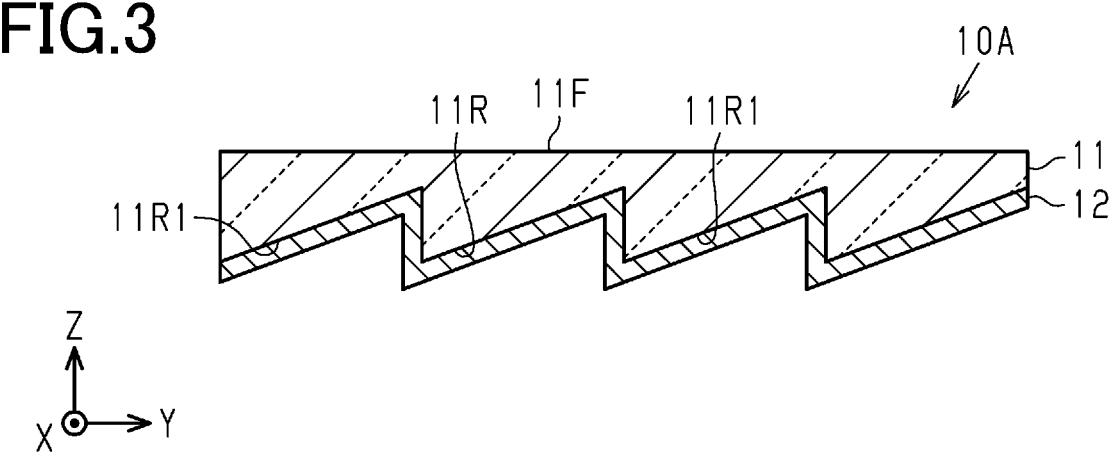
FIG. 3 is a conceptual cross-sectional view of a structure of a modified example in the reflection suppression segment of the first embodiment of the present invention.

That is, as shown in FIG. 3, a reflection suppression segment 10A may further include a reflective layer 12 on the inclined surfaces 11R1. The reflective layer 12 has a shape that follows the embossed surface 11R of the dielectric layer 11. As shown in FIG. 3, the reflective layer 12 may cover the entire embossed surface 11R, or it may only cover the inclined surfaces 11R1 of the embossed surface 11R. Thickness of reflection layers other than the inclined surfaces 11R1 of the embossed surface 11R in the embossed surface 11R may be thinner than the thickness of the reflective layer of the inclined surfaces 11R1. By arranging the reflective layer 12 so as to be positioned on the inclined surfaces 11R1, the efficiency for reflecting the reflection light at the reflection suppression segment 10A where light is incident is enhanced. It is possible to observe an image formed by the reflection suppressing segment 10 from a side of the embossed surface 11R facing away from the flat surface 11F.

The reflective layer 12 covers the whole or a portion of the embossed surface 11R of the reflection suppressing segment 10. When the reflective layer 12 covers a portion of the embossed surface 11R of the reflection suppression segment 10, the contour of the reflective layer 12 can be a sub-display. The outer shape of the reflective layer 12 may be a linear sub-display. The linear sub-display may have a geometric pattern or a line pattern. The geometric pattern may be a colored pattern. The display may have a reflection suppression segment 10 in which the entire embossed surface 11R is covered, a reflection suppression segment 10 in which a portion of the embossed surface 11R is covered by the reflective layer 12, or a reflection suppression segment 10 in which the embossed surface 11R is not covered.

The reflective layer 12 covering a portion of the embossed surface 11R of the reflection suppression segment 10 may be formed by etching a portion of a deposited reflective layer. In order to etch a portion of the deposited reflective layer, it is formed by masking a portion of the reflective layer using a resist, ink, and an inactivating layer, and etching the area other than the masked area using acid or alkali.

The reflective layer 12 may be made transparent or opaque or translucent. The entire reflective layer 12 covering the embossed surface 11R may be made transparent or opaque. A portion of the reflective layer 12 covering the embossed surface 11R may also be made transparent and the remainder may be made opaque or translucent. The reflective layer covering the inclined surfaces 11R1 may also be made opaque or translucent, and the reflective layer covering the portion other than the inclined surfaces 11R1 in the embossed surface 11R may be made transparent.

The reflective layer 12 may be formed by either a metal or an alloy. The reflective layer 12 may be formed by a metal alloy or silicon oxide. The metal may be aluminum, gold, silver, platinum, nickel, tin, chromium, zirconium or the like. The alloy may be an alloy of these metals. Metal compounds may be a metal sulfide, a metal oxide, or a metal fluoride. Metals applicable to the metal compound are zinc, tin, titanium, calcium, magnesium or the like. The metal sulfide may be zinc sulfide. The metal oxide may be zinc oxide, tin oxide, titanium oxide, or zirconium oxide. The metal fluoride may be calcium fluoride or magnesium fluoride. The reflective layer formed by a metal or a metal alloy may be an opaque or translucent reflective layer. On the other hand, the reflective layer formed by a metal alloy or silicon oxide may be a transparent reflective layer. The transparent reflective layer may be a single layer or multilayer. The reflective layer that is the multilayer may be formed by alternately depositing formation materials having different complex refractive indexes. The alternately deposited forming materials for a reflective layer that is a multilayer may be a metal compound, silicon oxide, metal or metal alloy.

Figure 4:
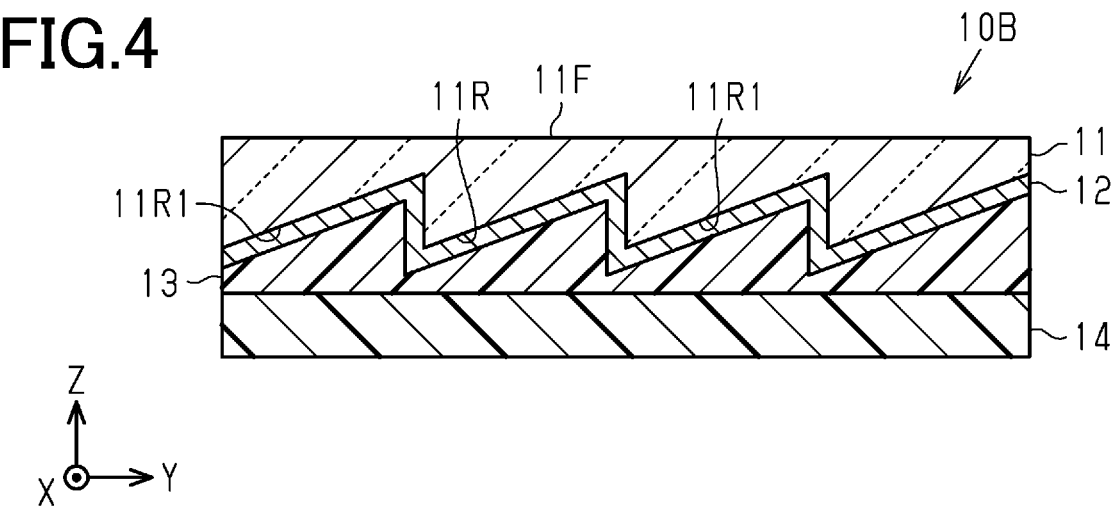
FIG. 4 is a conceptual cross-sectional view of a structure of a modified example in the reflection suppression segment of the first embodiment of the present invention.

As shown in FIG. 4, in addition to the reflective layer 12, a reflection suppression segment 10B may include an adhesive layer 13 located on a side of the reflective layer 12 facing away from the dielectric layer 11, and an adherend 14 located on a side of the adhesive layer 13 facing away from the reflective layer 12. Thus, the rigidity of the reflection suppression segment 10B is enhanced by bonding the adherend 14 to the dielectric layer 11 via the adhesive layer 13. As a result, generation of wrinkles and the like to the reflection suppression segment 10B is suppressed. The adherend 14 can be printed matter. The printed matter may be a sheet of paper or a plastic film with printing applied. This plastic film may be coated. This coat can be an anchor coat. The paper for the printed matter may be a coated paper. The thickness of the printed material may be 50 µm or more and 2 mm or less.

By affixing a display on the printed matter, a printed material having the display is obtained. The printed matter having the display may be coated, printed, or both coated and printed after the display is adhered. The printed matter having the display is excellent in decorativeness and security. The printed matter having the display may be used as a card, passport, banknote, security tag, or security label.

When the reflection suppression segment 10 is observed from the perpendicular direction to the flat surface 11F, reflected light is not observed, and therefore the reflection suppression segment 10 does not inhibit the visibility of the printed matter. The display may be embedded in a laminate by laminating the display using a sheet. The laminate may be a card or page. The laminate may have a thickness of 300 µm or more and 3 mm or less. The outermost surface of the laminate covering the display may be a mirror surface or a mat surface.

Figure 5:
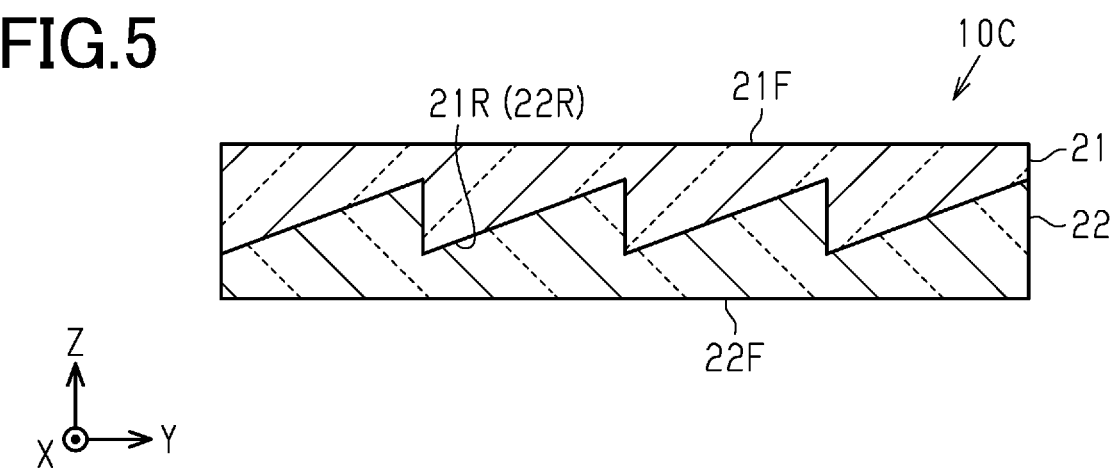
FIG. 5 is a conceptual cross-sectional view of a structure of a modified example in the reflection suppression segment of the first embodiment of the present invention.

As shown in FIG. 5, a reflection suppression segment 10C may include a first dielectric layer 21 and a second dielectric layer 22. The first dielectric layer 21 corresponds to the dielectric layer 11 mentioned above. The first dielectric layer 21 includes an embossed surface 21R and a flat surface 21F. The second dielectric layer 22 covers the embossed surface 21R of the first dielectric layer 21. In the second dielectric layer 22, the surface opposite to the embossed surface 21R is a flat surface 22F. The second dielectric layer 22 has a function of protecting the embossed surface 21R of the first dielectric layer 21. The second dielectric layer 22 has an embossed surface 22R that is homologous to the embossed surface 21R of the first dielectric layer 21 at the interface between the first dielectric layer 21 and the second dielectric layer 22.

In the second dielectric layer 22, the surface on the opposite side to the embossed surface 22R is preferably the flat surface 22F. By the second dielectric layer 22 having the flat surface 22F as a surface on the opposite side to the embossed surface 22R, Formula (1) mentioned above is applied to the second dielectric layer 22 when the reflection suppression segment 10C is observed from a side of the second dielectric layer 22 facing away from the first dielectric layer 21. Thereby, even if an observer observes the reflection suppression segment 10C from the side of the first dielectric layer 21 facing away from the second dielectric layer 22, or even if the observer observes the reflection suppression segment 10C from the side of the second dielectric layer 22 facing away from the first dielectric layer 21, the observer visually recognizes the image mentioned above.

In order to be able to observe the image in both the case of observing the reflection suppression segment 10C from the side of the first dielectric layer 21 facing away from the second dielectric layer 22, and the case of observing the reflection suppression segment 10C from the side of the second dielectric layer 22 facing away from the first dielectric layer 21, it is preferable that the refractive index of each dielectric layer be set as follows. That is, the difference in refractive index between the first dielectric layer 21 and the second dielectric layer 22 is preferably 0.2 or more and 1.0 or less. Thereby, reflection is likely to occur at the inclined surfaces which includes each of the embossed surfaces 21R and 22R.

When the reflection suppression segment 10C is observed from the side of the first dielectric layer 21 facing away from the second dielectric layer 22, the refractive index of the second dielectric layer 22 is preferably lower than the refractive index of the first dielectric layer 21 by 0.4 or more. Thereby, because the difference in refractive index between the first dielectric layer 21 and the second dielectric layer 22 becomes large, reflection at the inclined surfaces due to Snell's law is likely to occur. On the other hand, when the reflection suppression segment 10C is observed from the side of the second dielectric layer 22 facing away from the first dielectric layer 21, for a similar reason to that mentioned above, the refractive index of the second dielectric layer 22 is preferably higher than the refractive index of the first dielectric layer 21 by 0.4 or more.

By the refractive index of the first dielectric layer 21 and the refractive index of the second dielectric layer 22 being different from each other, it is possible to have the emergence angle at which light incident from the first dielectric layer 21 emerges from the flat surface 21F and the emergence angle at which light incident from the second dielectric layer 22 emerges from the flat surface 22F be different from each other.

The reflection suppression segment 10C may include a reflective layer between the first dielectric layer 21 and the second dielectric layer 22. Such a reflective layer has a shape on the embossed surface which is included in each of the dielectric layers. The reflective layer may be formed of any materials for forming the reflective layer which is provided with the reflection suppression segment 10A.

The reflection suppression segment 10 may be, for example, a counterfeit prevention medium for resisting counterfeiting of a passport or an ID card. Alternatively, the reflection suppression segment 10 may be a medium for enhancing designability of an article having the reflection suppression segment 10, or the reflection suppression segment 10 itself may be a subject of observation.

Second Embodiment of the Present Invention

With reference to FIG. 6 to FIG. 14, the second embodiment of the present invention in which a display 30 including a reflection suppression segment is embodied will now be described. The display according to the second embodiment of the present invention contains components equivalent to those of the reflection suppression segment 10 according to the first embodiment of the present invention described above. Thus, components equivalent to those of the first embodiment are assigned the same reference signs as those of the first embodiment. Accordingly, detailed description of components in common with those of the first embodiment is omitted. Hereinafter, the structure of a display, the observation state of the display, and a method of producing the display will be individually described.

[Structure of Display]

Figure 7:
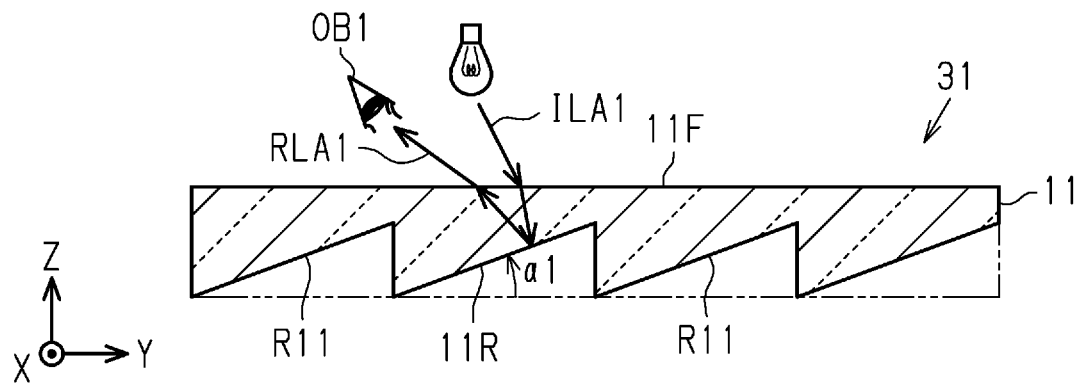
FIG. 7 is a conceptual partially enlarged cross-sectional view of an enlarged portion of a dielectric layer provided in a display according to the second embodiment of the present invention.
Figure 8:
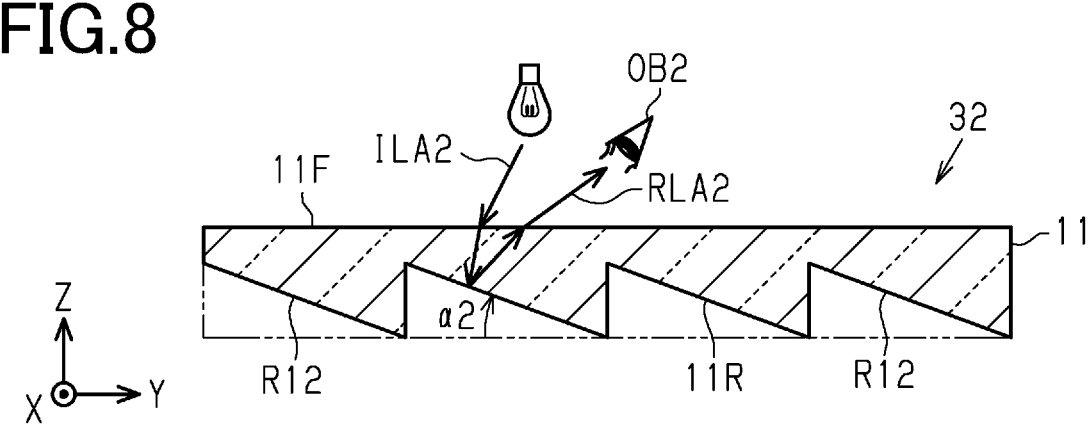
FIG. 8 is a conceptual partially enlarged cross-sectional view of an enlarged portion of the dielectric layer provided in the display according to the second embodiment of the present invention.

The structure of the display will be described with reference to FIG. 6 to FIG. 8. In FIG. 7 and FIG. 8, only the dielectric layer that is included in the display is illustrated for convenience of description and illustration.

Figure 6:
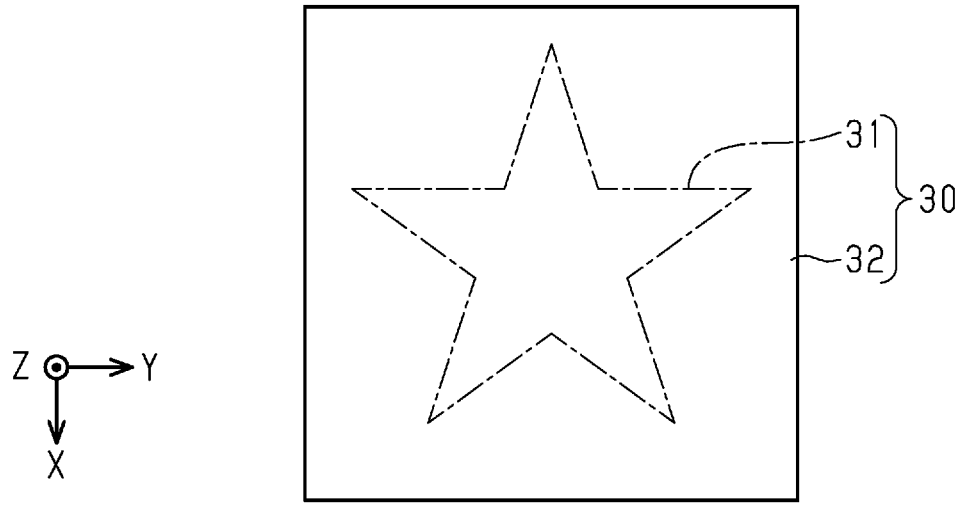
FIG. 6 is a conceptual plan view of a structure in a display according to a second embodiment of the present invention.

As shown in FIG. 6, the display 30 includes a plurality of reflection suppression segments. In the present embodiment, the display 30 comprises a first reflection suppression segment 31 and a second reflection suppression segment 32. The first reflection suppression segment 31 and the second reflection suppression segment 32 share one dielectric layer. A flat surface of the reflection suppression segments 31 and 32 is included in one flat surface in the dielectric layer, and an embossed surface of the reflection suppression segments 31 and 32 is included in one embossed surface of the dielectric layer. When the display 30 is observed from a predetermined fixed point located on a side of the flat surface of the dielectric layer facing away from the embossed surface of the dielectric layer, and located in an oblique direction with respect to the flat surface of the dielectric layer, the dielectric layer includes reflection suppression segments 31 and 32 having different brightness of reflected light from each other. That is, when the display 30 is observed from the fixed point, the brightness of the reflected light in the first reflection suppression segment 31 and the brightness of the reflected light in the second reflection suppression segment 32 are different from each other.

The display 30 forms an image of a motif by using the reflection suppression segment. The image of the motif may be in association with geometric patterns, symbols, coat of arms, crests, flags, emblems, shields, swords, feathers, plants, animals and birds.

As mentioned above, the angle formed between the azimuth direction at the time the normal direction of the inclined surface is projected onto the X-Y plane and the reference direction in the X-Y plane, is the azimuth angle. The X direction is an example of the reference direction. By having different azimuth angles from each other between the reflection suppression segments 31 and 32, the dielectric layer is composed such that the brightness between the reflection suppression segments 31, 32 are different from each other when the display 30 is observed from the fixed point.

In each of the reflection suppression segments 31 and 32, the elevation angles and the azimuth angles at all the inclined surfaces included in each reflection suppression segment are equal to one another. On the other hand, the azimuth angle of the inclined surfaces belonging to the first reflection suppression segment 31 and the azimuth angle of the inclined surfaces belonging to the second reflection suppression segment 32 are different from each other. However, the elevation angle of the inclined surfaces belonging to the first reflection suppression segment 31 are equal to each other and the elevation angle of the inclined surfaces belonging to the second reflection suppression segment 32 are equal to each other.

As viewed perpendicular to a plane in which the display 30 is located, the first reflection suppression segment 31 has a stellar shape and the second reflection suppression segment 32 has a frame shape surrounding the circumference of the first reflection suppression segment 31. As viewed perpendicular to a plane in which the display 30 is located, the first reflection suppression segment 31 and the second reflection suppression segment 32 form one rectangle. Shapes of the first reflection suppression segment 31 and the second reflection suppression segment 32 may be a rectangular shape, a circular shape, a triangular shape or the like.

The azimuth angle of the first reflection suppression segment 31 and that of the second reflection suppression segment 32 are different from each other. As such, for an observer who observes the display 30 along the oblique direction from a fixed point on a plane defined by the azimuth direction and the Z direction of the first reflection suppression segment 31, the brightness of reflected light emerging from the first reflection suppression segment 31 towards the fixed point and the brightness of reflected light emerging from the second reflection suppression segment 32 towards the fixed point are visually recognized to be different from each other. That is, because the fixed point is present on a plane defined by the azimuth direction and the Z direction corresponding to those of the first reflection suppression segment 31, the reflected light reflected from the first reflection suppression segment 31 emerges towards the fixed point.

On the other hand, because the fixed point is not present on the plane defined by the azimuth direction and the Z direction corresponding to those of the second reflection suppression segment 32, the reflected light reflected from the second reflection suppression segment 32 is not observed from the fixed point. Alternatively, the brightness of the reflected light observed at the fixed point, and emerging from the second reflection suppression segment 32, is conspicuously low. Therefore, a difference arises in brightness between the first reflection suppression segment 31 and the second reflection suppression segment 32 at the fixed point. That is, by the azimuth angle of the first reflection suppression segment 31 and the azimuth angle of the second reflection suppression segment 32 being different from each other, the observer visually distinguishes the difference between the first reflection suppression segment 31 and the second reflection suppression segment 32 at the fixed point.

In summary, in the display 30, the azimuth angle of the first reflection suppression segment 31 and the azimuth angle of the second reflection suppression segment 32 are different from each other, and thereby the display 30 displays an image formed based on the difference between the brightness of the reflected light emerging from the first reflection suppression segment 31 and the brightness of the reflected light emerging from the second reflection suppression segment 32. For this reason, the image displayed to the observer who obliquely views the display 30 is made more sophisticated. Therefore, the effect of resisting counterfeiting of the display 30, and the effect of resisting counterfeiting of an article including the display 30, are enhanced.

The first reflection suppression segment 31 and the second reflection suppression segment 32 hold down emergence of the reflected light in the direction in which the observer views the display 30 in plan view. For this reason, the observer who observes the display 30 in plan view direction visually recognizes both the image that the first reflection suppression segment 31 displays towards plan view direction, and the image that the second reflection suppression segment 32 displays towards the plan view direction as black images. Thereby, when an observer observes the display 30 in plan view direction, the observer visually recognizes the images that the display 30 displays as one image having black. As such, the display 30 conceals the image from the observer formed based on the difference between the brightness of the reflected light in the first reflection suppression segment 31 and the brightness of the reflected light in the second reflection suppression segment 32.

With reference to FIG. 7 and FIG. 8, the structure of the display 30 will be described in more detail.

FIG. 7 shows an enlarged portion of a cross-sectional structure along the Y-Z plane in the first reflection suppression segment 31. In the first reflection suppression segment 31, a counterclockwise angle in the paper is a positive angle, and a clockwise angle in the paper is a negative angle. The counterclockwise angle in the paper is the same as the counterclockwise angle in the first embodiment, and the clockwise angle in the paper is the same as the clockwise angle in the first embodiment.

As shown in FIG. 7, the first reflection suppression segment 31 includes a portion of the dielectric layer 11, and thereby includes a plurality of first inclined surfaces R11 included in the embossed surface 11R of the dielectric layer 11. The elevation angle of the first inclined surfaces R11 is a first elevation angle $\alpha 1$, and the first elevation angle $\alpha 1$ meets Formula (1) in the first embodiment. As such, reflection of incident light incident on the first reflection suppression segment 31 toward plan view direction of the display 30 is suppressed, and the incident light is reflected toward the positive direction in an oblique direction of the display 30, that is toward the obliquely viewing direction from the left side of the FIG. 7.

In the first reflection suppression segment 31, first elevation angles $\alpha 1$ in all the first inclined surfaces R11 have the same values with one another. The inclining directions are the same with one another. In other words, the normal line vectors of all the first inclined surfaces R11 are parallel to one another. Therefore, at a first fixed point OB1 on a plane defined by the azimuth direction and the Z direction corresponding to those of the first reflection suppression segment 31, the reflected light of the first incident light ILA1 incident on the first reflection suppression segment 31 is visually recognized as a first reflected light RLA1. That is, the first reflected light RLA1 emerging from the first reflection suppression segment 31 is visually recognized as light having a uniform brightness for the observer observing from the first fixed point OB1.

The inclined surfaces are aligned in each segment. The inclined surfaces aligned in the first reflection suppression segment are aligned at constant intervals or are aligned at various intervals. The display may include a reflection suppression segment in which inclined surfaces are aligned at constant intervals, and a reflection suppression segment in which inclined surfaces are aligned at various intervals. The intervals of the inclined surfaces that are aligned in different reflection suppression segments in the display may be different. This alignment interval is not usually visually perceived, but it is visually perceived under a special condition. This special condition is a condition using point illumination.

FIG. 8 shows an enlarged portion of a cross-sectional structure along the Y-Z plane in the second reflection suppression segment 32. In the second reflection suppression segment 32, counterclockwise angles in the plane of the paper are positive angle, and clockwise angles in the paper are negative angle. The counterclockwise angle in the paper is the same as the counterclockwise angle in the first embodiment, and the clockwise angle in the paper is the same as the clockwise angle in the first embodiment.

As shown in FIG. 8, the second reflection suppression segment 32 includes a portion of the dielectric layer 11, and thereby includes a plurality of second inclined surfaces R12 included in the embossed surface 11R of the dielectric layer 11. A second elevation angle $\alpha 2$, which is an elevation angle of second inclined surfaces R12, meets Formula (1) in the first embodiment of the present invention, and concurrently has the same size as the first elevation angle $\alpha 1$ of the first inclined surfaces R11 in the first reflection suppression segment 31. The azimuth angle of the first reflection suppression segment 31 and the azimuth angle of the second reflection suppression segment 32 are different by 180°. The incident light incident on the second reflection suppression segment 32 is suppressed to be reflected toward plan view direction of the display 30, and the incident light is reflected to the positive direction in an oblique direction of the display 30, that is, to the obliquely viewing direction from the right side in FIG. 8.

In the second reflection suppression segment 32, second elevation angles $\alpha 2$ in all the second inclined surfaces R12 have the same values with one another. The inclining directions are the same with one another. Therefore, at a second fixed point OB2 on a plane defined by the azimuth direction corresponding to those of the second reflection suppression segment 32 and Z direction, the reflected light of the second incident light ILA2 incident on the second reflection suppression segment 32 is visually recognized as second reflected light RLA2 which is different from the first reflected light RLA1. That is, the second reflected light RLA2 emerging from the second reflection suppression segment 32 is visually recognized as light having a uniform brightness by the observer observing the display 30 from the second fixed point OB2. As mentioned above, the azimuth angle of the first reflection suppression segment 31 and the azimuth angle of the second reflection suppression segment 32 are different by 180°, and therefore the first fixed point OB1 and the second fixed point OB2 are located on the same Y-Z plane, and they are located so as to have mirror symmetry about a normal line passing through the center of the display 30.

In the display 30, as described above, the fixed point on a plane defined by the azimuth direction and the Z direction of each inclined surface is a point from which the observer observes the display 30. In other words, the side of the flat surface 11F of the dielectric layer 11 facing away from the embossed surface 11R is the side that the light incident on the display 30, and also the side for observing the display 30.

[State of Observing Display]

Figure 9:
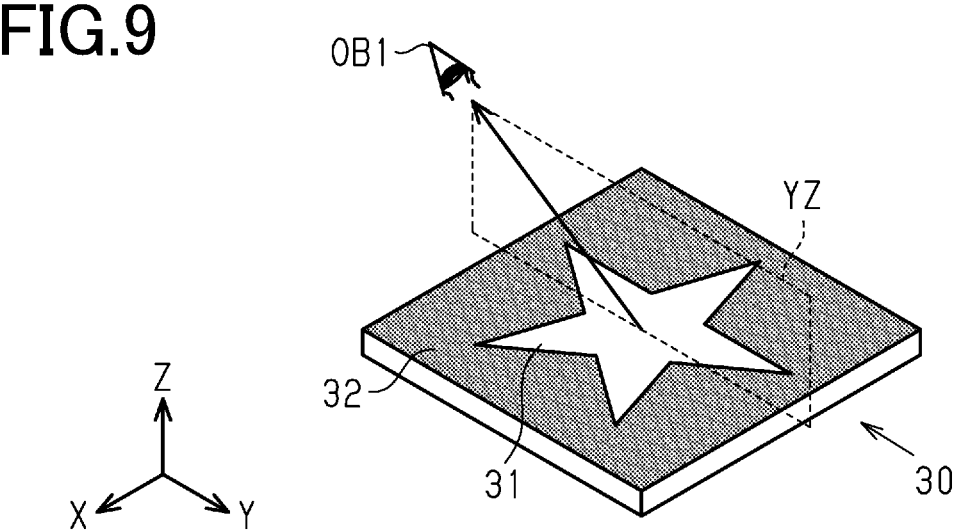
FIG. 9 is a conceptual diagram in an observing state of a display when the display of the second embodiment of the present invention is observed from a first fixed point.
Figure 10:
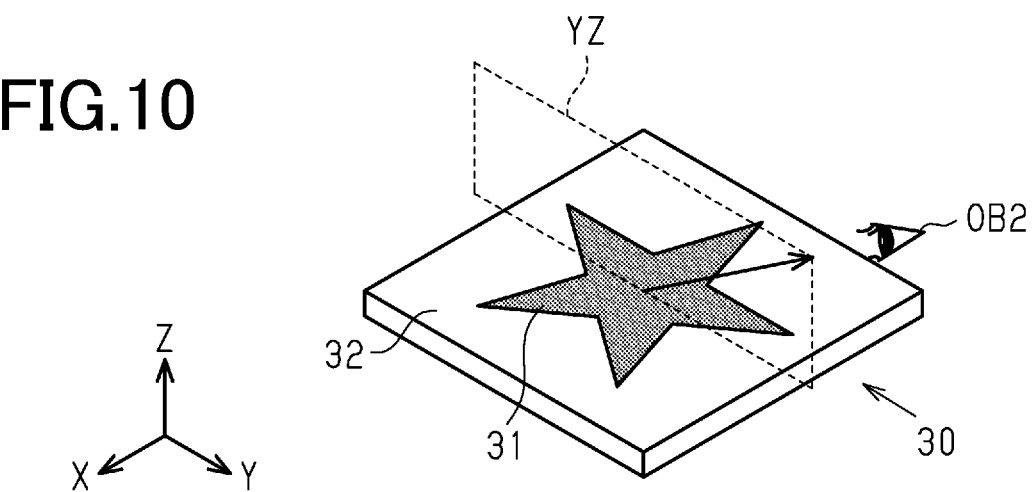
FIG. 10 is a conceptual diagram in an observing state of a display when the display of the second embodiment of the present invention is observed from a second fixed point.
Figure 11:
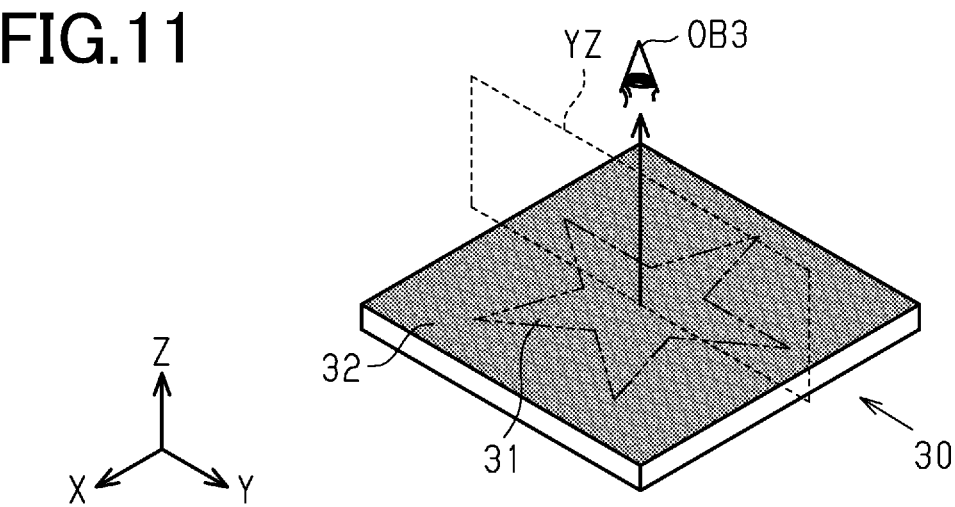
FIG. 11 is a conceptual diagram in an observing state of a display when the display according to the second embodiment of the present invention is viewed in plan view.

The state of observing the display 30 shall be described with reference to FIG. 9 to FIG. 11. FIG. 9 shows a state of observing the display 30 when an observer is observing the display 30 from the first fixed point OB1 on the YZ plane. FIG. 10 shows a state of observing the display 30 when the observer is observing the display 30 from the second fixed point OB2 on the YZ plane. FIG. 11 shows a state of observation when the observer is observing the display 30 from a third fixed point in plan view direction of the display 30.

As shown in FIG. 9, when the observer is observing the display 30 from the first fixed point OB1, reflected light emerges from the first reflection suppression segment 31 towards the first fixed point OB1, and therefore the observer visually recognizes an image that the first reflection suppression segment 31 displays, where the image is relatively brighter. On the other hand, the reflected light does not emerge from the second reflection suppression segment 32 towards the first fixed point OB1, and therefore the observer visually recognizes an image that the second reflection suppression segment 32 displays, where the image is relatively darker. As such, the first reflection suppression segment 31 and the second reflection suppression segment 32 respectively display images having different brightness towards the first fixed point OB1. As such, the observer visually distinguishes the difference between the first reflection suppression segment 31 and the second reflection suppression segment 32 at the first fixed point OB1.

As shown in FIG. 10, when the observer is observing the display 30 from the second fixed point OB2, reflected light does not emerge from the first reflection suppression segment 31 towards the second fixed point OB2, and therefore the observer visually recognizes an image that the first reflection suppression segment 31 displays, where the image is relatively darker. On the other hand, reflected light emerges from the second reflection suppression segment 32 towards the second fixed point OB2, and therefore the observer visually recognizes an image that the second reflection suppression segment 32 displays, where the image is relatively brighter. As such, the first reflection suppression segment 31 and the second reflection suppression segment 32 respectively displays images having different brightness towards the second fixed point OB2. Thus, the observer visually distinguishes the difference between the first reflection suppression segment 31 and the second reflection suppression segment 32 at the second fixed point OB2.

In the display 30, the size of the first elevation angle $\alpha 1$ and that of the second elevation angle $\alpha 2$ are equal to each other. As such, by changing the observation point of the display 30 between the first fixed point OB1 and the second fixed point OB2, it is possible to reverse the brightness order of the reflected light between the first reflection suppressing segment 31 and the second reflection suppressing segment 32. That is, the display 30 displays an image to the second fixed point OB2 that has a reversed relationship between the brightness of the first reflection suppression segment 31 and the brightness of the second reflection suppression segment 32 from the relationship therebetween in an image displayed towards first fixed point OB1.

As shown in FIG. 11, when the observer is observing the display 30 from the third fixed point OB3, in other words, when the observer is observing the display along the Z direction, reflection light does not emerge either from the first reflection suppression segment 31 or the second reflection suppression segment 32 towards the third fixed point OB3. As such, the first reflection suppression segment 31 and the second reflection suppression segment 32 both display a darker image towards the third fixed point OB3. Therefore, the observer cannot visually distinguish the difference between the first reflection suppression segment 31 and the second reflection suppression segment 32 at the third fixed point OB3. In other words, in plan view direction, the display 30 conceals from the observer an image that the display 30 can display.

[Method of Producing Display]

Figure 12:
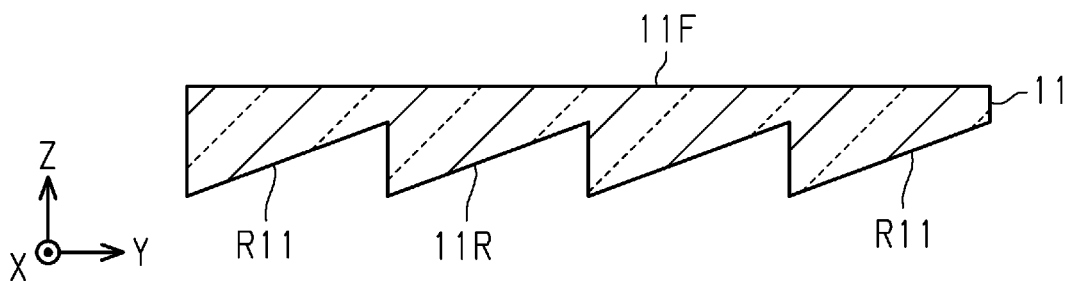
FIG. 12 is a conceptual process diagram for forming a dielectric layer in a method of producing the display according to the second embodiment of the present invention.
Figure 13:
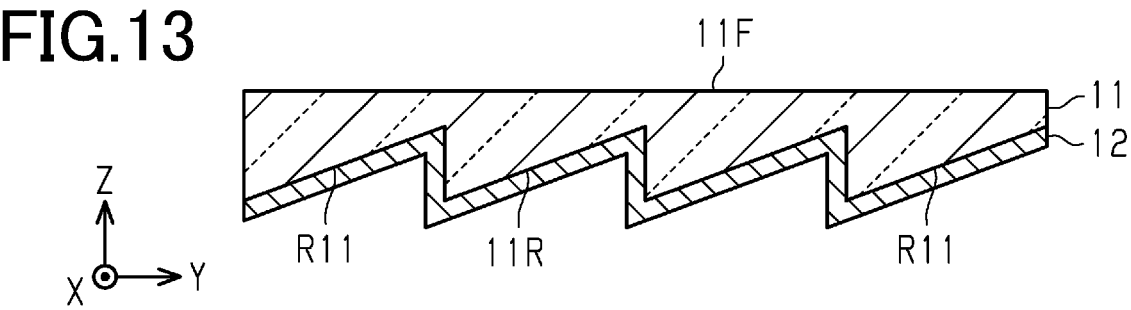
FIG. 13 is a conceptual process diagram for forming a reflective layer in the method of producing the display according to the second embodiment of the present invention.
Figure 14:
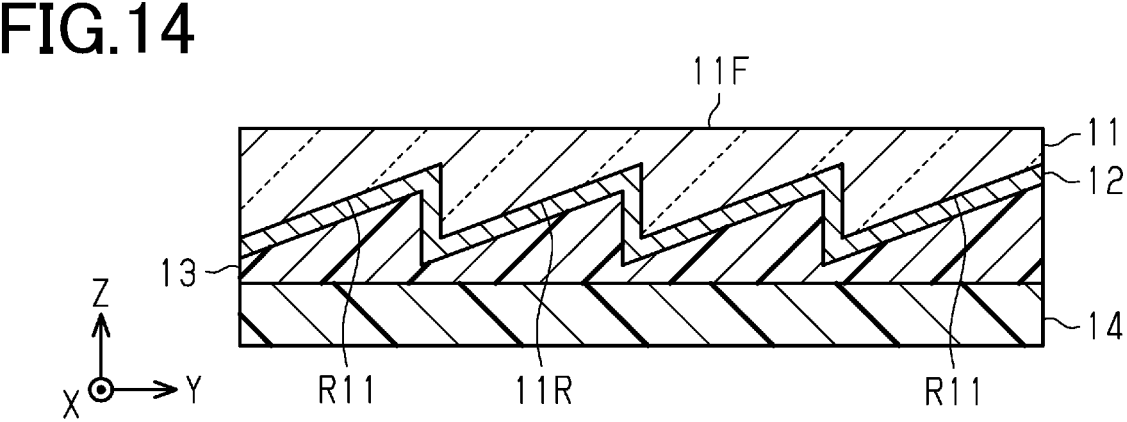
FIG. 14 is a conceptual process diagram for bonding a dielectric layer to an adherend in the method of producing a display according to the second embodiment of the present invention.

A method of producing the display 30 mentioned above will be described with reference to FIG. 12 to FIG. 14. Hereinafter, the method of producing the display 30 will be described, where the display 30 comprises a reflective layer, an adhesive layer, and a base material in addition to the dielectric layer 11 mentioned above. That is, the reflection suppression segment included in the display 30 corresponds to the reflection suppression segment 10B which is a modification of the first embodiment of the present invention. Therefore, a reference sign is assigned to each portion described in FIG. 12 to FIG. 14 corresponding to each portion in which the reflection suppression segment 10B includes. FIG. 12 to FIG. 14 show cross-sectional structures corresponding to the first reflection suppression segment 31 in the display 30.

As shown in FIG. 12, when producing the display 30, first, the dielectric layer 11 including the flat surface 11F and the embossed surface 11R is formed. The method of forming the dielectric layer 11 having the embossed surface 11R including a plurality of first inclined surfaces R11 may be a method where, after producing an original plate corresponding to a shape of the embossed surface 11R, the uneven shape of the original plate is replicated by covering a stamp surface with the dielectric layer 11. That is, by embossing the stamp surface of the original plate onto the dielectric layer 11 of the display 30, the embossed surface 11R is formed on the dielectric layer 11.

When producing the original plate, at first, a photosensitive resist is coated on one surface of a flat substrate. Then, the photosensitive resist is irradiated with a beam to expose a portion of the photosensitive resist. Next, the photosensitive resist is developed. Then, a metal stamper is formed by electroplating or the like from the developed photosensitive resist. An original plate having a stamp surface corresponding to the shape of the embossed surface 11R is formed using the metal stamper as a matrix. The metal stamper may also be formed by cutting a metal plate.

The stamp surface having the same shape as the embossed surface 11R of the display 30 of the original plate is covered with a material for forming the dielectric layer 11. As a result, the dielectric layer 11 having the embossed surface 11R replicating the embossed surface of the original plate is formed. That is, by embossing the stamp surface of the original plate onto the dielectric layer 11 of the display 30, the embossed surface 11R is formed on the dielectric layer 11. The dielectric layer 11 may be a multilayer. When the dielectric layer 11 is a multilayer, the material of the dielectric layer including the flat surface 11F and the material of the dielectric layer including the embossed surface 11R may be different. Thereby, a material adequate for the dielectric layer including the flat surface 11F and a material adequate for the dielectric layer including the embossed surface 11R may be individually applied. For example, the dielectric layer including the flat surface 11F may be made of a hard material, and the dielectric layer including the embossed surface 11R may be made of a highly formable resin. The hard material may be an acrylic resin. The hard material may have a pencil hardness (JISK5600) of H or higher.

The resin with high formability may be a soft resin. The soft resin may be a thermoplastic resin. The soft resin may be a crosslinked resin. The crosslinked resin is not easily deformed after forming.

The dielectric layer 11 may be formed of a resin. The resin of the forming material may be a thermoplastic resin or a cured resin. Examples of the various resins include, for example, poly (meth) acrylic resin, polyurethane resin, fluorine resin, silicone resin, polyimide resin, epoxy resin, polyethylene resin, polypropylene resin, methacrylic resin, polymethylpentene resin, cyclic polyolefin resin, polystyrene resin, polyvinyl chloride resin, polycarbonate resin, polyester resin, polyamide resin, polyamideimide resin, polyaryl phthalate resin, polysulfone resin, polyphenylene sulfide resin, polyether sulfone resin, polyethylene naphthalate resin, polyether imide resin, acetal resin, and cellulose resin. The polystyrene resin may be acrylonitrile-(poly) styrene copolymer (AS resin), acrylonitrile-butadiene-styrene copolymer (ABS resin) or the like. The dielectric layer 11 may be formed of only one of these resins or two or more of these resins. These resins generally become thermoplastic resins when a curing agent is not added, while they become cured resins by adding a curing agent. The dielectric layer may have a thickness of 1 µm or more and 20 µm or less.

The dielectric layer 11 may further be formed to contain an additive. The additive may be at least one of a curing agent, plasticizer, dispersant, various leveling agents, ultraviolet light absorber, antioxidant, viscosity modifier, lubricant, light stabilizer and the like.

As shown in FIG. 13, the reflective layer 12 is formed so as to follow the embossed surface 11R of the dielectric layer 11. The reflective layer 12 may be formed by a deposition method. In a step of forming the reflective layer 12, the method of forming the reflective layer 12 may be either physical or chemical vapor deposition. The physical vapor deposition may be vacuum deposition, sputtering, ion plating, ion cluster beam, or the like. The chemical vapor deposition may be a plasma chemical vapor deposition, thermochemical vapor deposition, photochemical vapor deposition, or the like. The reflective layer 12 may have a thickness of 10 nm or more and 300 nm or less. The reflective layer may be transparent or concealed.

Among these methods, vacuum deposition and ion plating are preferable in terms of having higher productivity than those of other methods and in terms of forming a reflective layer 12 having good quality. The film forming conditions in physical vapor deposition and chemical vapor deposition may be selected depending on the material for forming the reflective layer 12.

As shown in FIG. 14, the adhesive layer 13 is formed on a surface opposite to the surface in contact with the dielectric layer 11 in the reflective layer 12. At this time, the adhesive layer 13 having a thickness so as to fill the unevenness of the laminate made up of the dielectric layer 11 and the reflective layer 12, is formed. Then, the adherend 14 is stacked on a surface opposite to the surface in contact with the reflective layer 12 in the adhesive layer 13. The adherend 14 and the reflective layer 12 are bonded with the adhesive layer 13. Thereby, the display 30 is obtained.

As described above, according to the display of the second embodiment of the present invention, effects listed below are obtained in addition to the effects described in the first embodiment mentioned above.

(2) The display 30 forms an image having different brightness for each of the reflection suppression segments 31 and 32 in the direction obliquely viewing the display 30. As such, the display 30 displays a more sophisticated image in the oblique direction of the display 30 as compared with a display including only one reflection suppression segment.

(3) By changing the azimuth angle of the inclined surfaces for each of the reflection suppression segments 31 and 32, light having different brightness is reflected from each of the reflection suppression segments 31 and 32 towards a fixed point located in the oblique direction of the display 30. Thereby, the display 30 forms an image of a motif composed of a plurality of regions having different brightness towards the fixed point.

(4) In plan view direction of the display 30, reflected light from each of the reflection suppression segments 31 and 32 is not visually recognized. As such, the display 30 conceals, from an observer, an image formed based on the difference in brightness of the reflected light in each of the reflection suppression segments 31 and 32 in plan view direction of the display 30.

Modification of Second Embodiment of the Present Invention

The second embodiment of the present invention mentioned above can be implemented with the following modifications.

Figure 15:
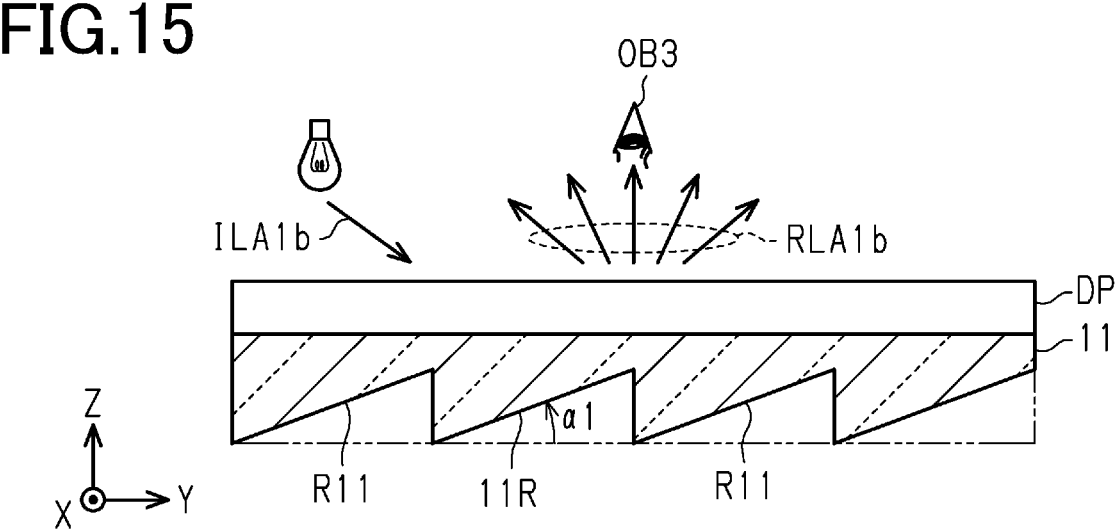
FIG. 15 is a conceptual partially enlarged cross-sectional view showing a state in which a diffuser is stacked on a flat surface in the display according to the second embodiment of the present invention.

As shown in FIG. 15, a diffuser DP may be stacked on the flat surface of the first reflection suppression segment 31. When an observer verifies the display 30, the diffuser DP may be used. The diffuser DP may be a frosted glass dispersion plate, lens dispersion plate, dispersion film containing a filler, foamed film or the like. The generally available diffuser DP may be a transparent one which disperses light. The transparent diffuser DP may be a transparent or a translucent one. The diffuser DP is stacked adjacent to or spaced from the display 30. The diffuser DP does not have to adhere to the display 30, and nor does it have to be in close contact with the display 30.

Under normal observation conditions in which the diffuser DP is not stacked, reflected light does not emerge in the direction in which the observer views the display 30 in plan view. Therefore, the observer visually recognizes the first reflection suppression segment 31 to be black. On the other hand, under the observation conditions in which the diffuser DP is stacked on the display 30, reflected light reflected in the direction in which the observer obliquely views the display 30 is dispersed by the diffuser DP, and a portion of the dispersed light is distributed in the direction in which the observer views the display 30 in plan view. Therefore, when the diffuser DP is stacked on the display 30, at the third fixed point OB3 viewing the display 30 in plan view, the observer visually recognizes a portion of the first reflected light RLA1b which is the reflected light of the first incident light ILA1b.

A portion of the light reflected at the inclined surfaces 11R1 is totally reflected at the flat surface 11F. Because the light totally reflected at the flat surfaces 11F does not emerge to the outside, the reflection suppression segment 10 appears dark. Of the light reflected at the inclined surfaces 11R1, the total amount of light totally reflected at the flat surface 11F depends on the inclination of the inclined surfaces 11R1. When the inclined surfaces 11R1 are nearly parallel to the flat surface 11F, the light totally reflected at the flat surface 11F is reduced. When the angle formed between the inclined surfaces 11R1 and the flat surface 11F becomes large, the amount of light totally reflected at the flat surface 11F increases. The brightness of the light emerging from the display 30 observed through the diffuser DP depends on the amount of light that is not totally reflected at the inclined surfaces 11R1. That is, in an image of the display observed through the diffuser DP, the brightness of the light is modulated by the angle of the inclined surfaces 11R1 to the flat surface 11F.

By stacking the diffuser DP on the flat surface 11F of the second reflection suppression segment 32, an observer viewing the display 30 in plan view visually recognizes the reflected light from the second reflection suppression segment 32, similarly to the case of the first reflection suppression segment 31.

Figure 16:
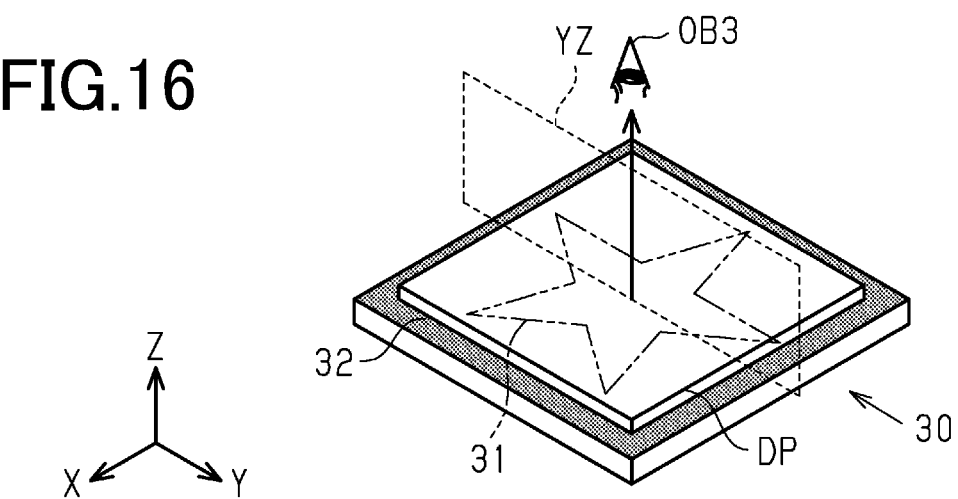
FIG. 16 is a conceptual diagram illustrating a state in which the display is viewed in plan view at a state in which a diffuser is stacked on the display according to the second embodiment of the present invention.

As shown in FIG. 16, when an observer is observing the display 30 from the third fixed point OB3 in a state in which the diffuser DP is stacked on the observation side of the display 30, reflected light emerges towards the third fixed point OB3 from a portion in which the diffuser DP is stacked on both the first reflection suppression segment 31 and the second reflection suppression segment 32. As such, the portion in which the diffuser DP is stacked on the first reflection suppression segment 31 and the second reflection suppression segment 32 displays a bright image, in other words, an image in white or gray, towards the third fixed point OB3. As such, the observer observes at the third fixed point OB3 an image different from that displayed in a state in which the diffuser DP is not stacked. That is, the display 30 is verified in the state in which the diffuser DP is stacked, in addition to the state in which the diffuser DP is not stacked.

By a simple method such as this, the display 30 is verified more reliably in two states. In other words, the display 30 is verified in a state in which the diffuser DP is not stacked and in a state in which the diffuser DP is stacked. It is extremely more difficult to produce counterfeits replicating these two states than to produce a counterfeit replicating a state in which the diffuser DP is not stacked. When attempting to produce a counterfeit, trying to replicate one state makes it difficult to replicate the other state. That is, it is extremely difficult to achieve both states in one counterfeit. The display may include a reflection suppression segment having a same inclining direction in the inclined surfaces, and a different elevation angle. The display may also include a reflection suppression segment having a same elevation angle in the inclined surfaces, and a different inclining direction. By adopting such methods, difficulty in producing counterfeits is further increased.

An example in which the azimuth angle of the first reflection suppression segment 31 and the azimuth angle of the second reflection suppression segment 32 are different by 180° has been described, but the difference between the azimuth angle of the first reflection suppression segment 31 and the azimuth angle of the second reflection suppression segment 32 may be an angle different from 180°. Even in such a case, when the display 30 is formed by combining the two reflection suppression segments 31 and 32, it is possible to obtain effects comparable to those of the second embodiment of the present invention.

The display 30 may include three or more types of reflection suppression segments having different azimuth angles from one another. In this case, because three or more types of reflection suppression segments having different azimuth angles from one another are used, the display displays a finer image. As a result, the display, and articles having the display enhances the effect resistant to counterfeiting. That is, by combining n types (n is a natural number of 2 or more) of reflection suppression segments having different azimuth angles, the display displays different images at n fixed points.

In the display 30, a region in which the first reflection suppression segment 31 is located and a region in which the second reflection suppression segment 32 is located do not overlap with each other as viewed perpendicular to a plane in which the display 30 is located. Furthermore, the first display region which is a region including the first inclined surfaces and the second display region which is a region including the second inclined surfaces may overlap with each other at least in a portion in each region as viewed perpendicular to a plane in which the display is located.

Figure 17:
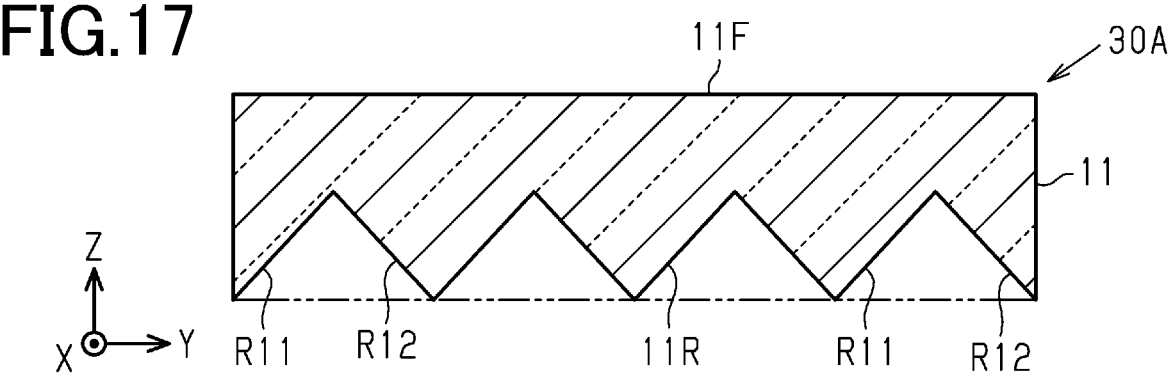
FIG. 17 is a conceptual partially enlarged cross-sectional view showing an enlarged portion of a modified example of the display according to the second embodiment of the present invention.

That is, as shown in FIG. 17, in a display 30A, the first inclined surfaces R11 and the second inclined surfaces R12 may be alternately arranged along the Y direction in a cross-section along the Y-Z plane, and the first inclined surfaces R11 and the second inclined surfaces R12 adjoining each other may repeat themselves. Thus, as viewed perpendicular to the plane of the display 30A, the first display region in which a plurality of the first inclined surfaces R11 are located and the second display region in which a plurality of the second inclined surfaces R12 are located overlap with each other at least in a portion of each region.

The display may include three or more reflection suppression segments arranged along one direction, and the azimuth angle may continuously vary by a predetermined angle between reflection suppression segments adjoining each other. That is, the difference obtained by subtracting the azimuth angle of the (n+1)th reflection suppression segment from the azimuth angle of the nth reflection suppression segment may be a predetermined value.

According to this, it is possible to obtain the effects described below.

(5) As an observer moves the point from which the display is observed, the observer visually recognizes that a high brightness portion of reflected light moves along the direction in which the reflection suppression segments are arranged, in the display. Thereby, a visual effect more impressive to the observer is imparted to the display.

The display 30 of the second embodiment of the present invention and modification examples of the display of the second embodiment of the present invention may be counterfeit resistant media resistant to counterfeiting of passports and ID cards similarly to the reflection suppression segment 10 mentioned above. Alternatively, the display 30 may be a medium to enhance designability of articles having the display 30, and the display 30 itself may be a target to be observed.

Third Embodiment of the Present Invention

A third embodiment of the present invention which embodies a display will be described with reference to FIG.

Figure 24:
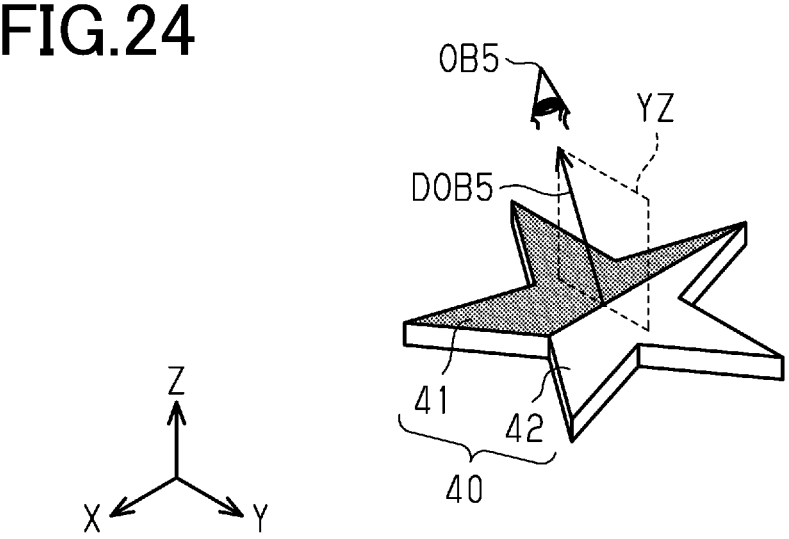
FIG. 24 is a conceptual diagram illustrating an observing state of the display according to the third embodiment of the present invention.

18 to FIG. 24. The display of the third embodiment of the present invention includes a structure equivalent to the reflection suppression segment 10 of the first embodiment of the present invention described above, and the structure of the inclined surfaces are different as compared with the display 30 of the second embodiment. The following description is focused on the difference between the second embodiment and the third embodiment. On the other hand, components equivalent to those of the first embodiment are assigned the same reference signs as those of the first embodiment. Accordingly, detailed description of components in common with those of the first embodiment is omitted. Hereinafter, the structure of the display and the state of observing the display will individually be described.

[Structure of Display]

The structure of the display will be described with reference to FIG. 18 to FIG. 20.

Figure 18:
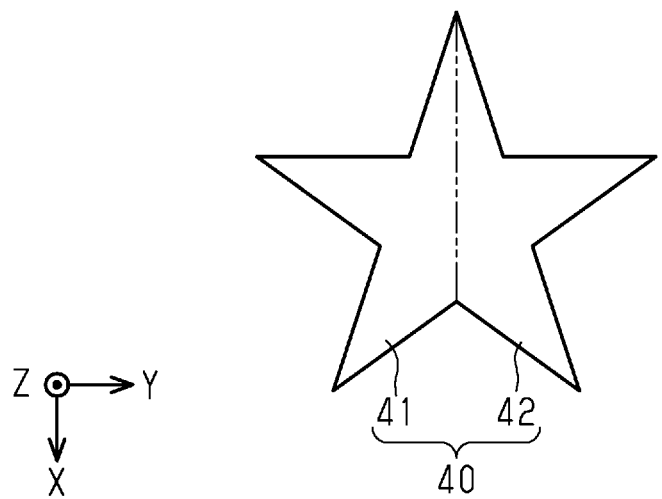
FIG. 18 is a conceptual plan view of a structure in a display according to a third embodiment of the present invention.

As shown in FIG. 18, a display 40 includes a plurality of reflection suppression segments. The display 40 of the present embodiment may be composed of a first reflection suppression segment 41 and a second reflection suppression segment 42. In FIG. 18, the first reflection suppression segment 41 and the second reflection suppression segment 42 share one dielectric layer. A flat surface of each reflection suppression segment is included in one flat surface in the dielectric layer, and an embossed surface of each reflection suppression segment is included in one embossed surface in the dielectric layer. When the display is observed from a predetermined fixed point located on a side of the flat surface of the dielectric layer facing away from the embossed surface of the dielectric layer, and located in an oblique direction with respect to the flat surface of the dielectric layer, the dielectric layer includes reflection suppression segments having different brightness of reflected light from each other. By having different elevation angles from each other between the reflection suppression segments 41 and 42, the dielectric layer is composed such that the brightness between the reflection suppression segments 41 and 42 are different from each other when the display 40 is observed from the fixed point.

In each of the reflection suppression segments 41 and 42, the elevation angles and the azimuth angles at all the inclined surfaces included in the reflection suppression segment are equal to one another. On the other hand, the azimuth angle of the inclined surfaces belonging to the first reflection suppression segment 41 and the azimuth angle of the inclined surfaces belonging to the second reflection suppression segment 42 are different from each other. However, the azimuth angle of the inclined surfaces belonging to the first reflection suppression segment 41 and the elevation angle of the inclined surfaces belonging to the second reflection suppression segment 42 are equal to each other. According to the display 40, by changing the elevation angle of the inclined surfaces for each of the reflection suppression segments 41 and 42, light having different brightness is reflected from each of the reflection suppression segments 41 and 42 towards a fixed point located in the oblique direction of the display 40. Thereby, the display 40 displays a motif image formed having regions of different brightness from one another towards the fixed point.

The display 40 has a stellar shape as viewed perpendicular to a plane in which the display 40 is located. One portion of the displays 40 divided into two in the Y direction is the first reflection suppression segment 41, and the other portion is the second reflection suppression segment 42. The first reflection suppression segment 41 and the second reflection suppression segment 42 together have a line-symmetric shape with respect to the boundary between each other as an axis of symmetry. The first reflection suppression segment 41 and the second reflection suppression segment 42 do not have to have a shape which bears a portion in one shape. In other words, the first reflection suppression segment 41 and the second reflection suppression segment 42 may have shapes that are independent of each other. Shape of each of the first reflection suppression segment 41 and the second reflection suppression segment 42 may be a rectangular shape, circular shape, triangular shape, etc.

Figure 19:
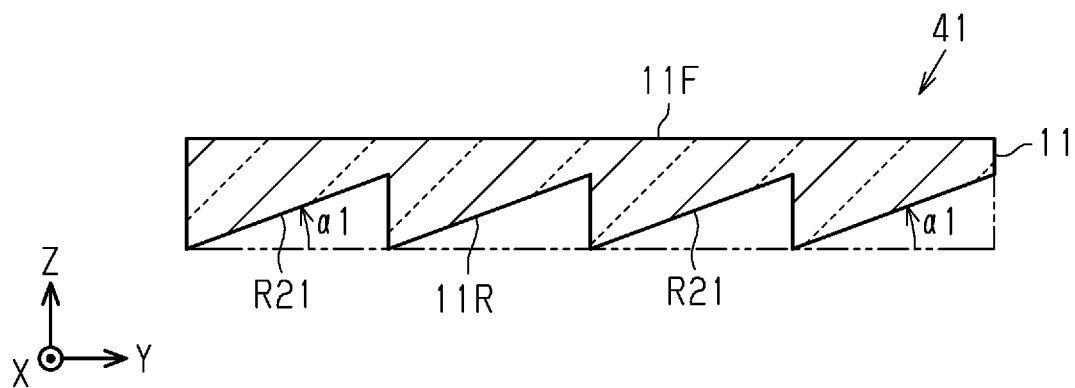
FIG. 19 is a conceptual partially enlarged plan view of a portion of a structure in a first reflection suppression segment of the third embodiment of the present invention.

FIG. 19 shows an enlarged portion of a cross-sectional structure along the Y-Z plane in the first reflection suppression segment 41. In the first reflection suppression segment 41, the counterclockwise angle in the paper is the positive angle, and the clockwise angle in the paper is the negative angle. The counterclockwise angle in the paper is the same as the counterclockwise angle in the first embodiment, and the clockwise angle in the paper is the same as the clockwise angle in the first embodiment.

As shown in FIG. 19, the first reflection suppression segment 41 includes a portion of the dielectric layer 11, and thereby includes a plurality of first inclined surfaces R21 included in the embossed surface 11R of the dielectric layer 11. The first elevation angle $\alpha 1$ which is an elevation angle of the first inclined surfaces R21 meets Formula (1) in the first embodiment. As such, reflection of incident light from the first reflection suppression segment 41 in plan view direction of the display 40 is suppressed, and the incident light is reflected in the positive direction in an oblique direction of the display 40, that is in the obliquely viewing direction from the left side of FIG. 19.

In the first reflection suppression segment 41, first elevation angles $\alpha 1$ in all the first inclined surfaces R21 have the same value with one another. As such, at a fourth fixed point on a plane defined by the azimuth direction and the Z direction corresponding to those of the first reflection suppression segment 41, reflected light from incident light incident on the first reflection suppression segment 41 is visually recognized. That is, reflected light emerging from the first reflection suppression segment 41 is visually recognized as light having a uniform brightness for an observer observing from the fourth fixed point.

Figure 20:
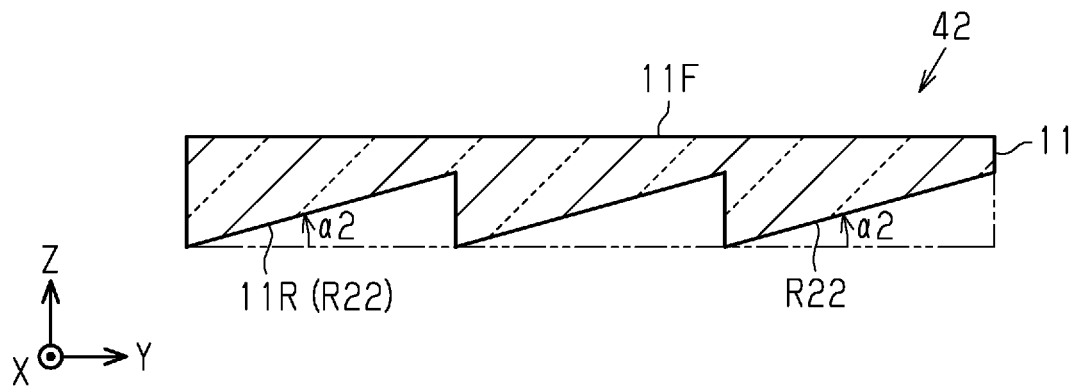
FIG. 20 is a conceptual partially enlarged plan view of a portion of a structure in a second reflection suppression segment of the third embodiment of the present invention.

FIG. 20 shows an enlarged portion of a cross-sectional structure along the Y-Z plane in the second reflection suppression segment 42. In the second reflection suppression segment 42, similarly to the first reflection suppression segment 41, the counterclockwise angle in the paper is the positive angle, and the clockwise angle in the paper is the negative angle.

As shown in FIG. 20, the second reflection suppression segment 42 includes a portion of the dielectric layer 11, and thereby includes a plurality of the second inclined surfaces R22 included in the embossed surface 11R of the dielectric layer 11. The second elevation angle $\alpha 2$ which is an elevation angle of the second inclined surfaces R22 meets Formula (1) in the first embodiment. Further, the second elevation angle $\alpha 2$ has a different size from that of the first elevation angle $\alpha 1$. The reflection of an incident light to the second reflection suppression segment 42 in plan view direction of the display 40 is suppressed, and the incident light is reflected to the positive direction in an oblique direction of the display 40, that is to an obliquely viewing direction from the left side of FIG. 20.

In the second reflection suppression segment 42, the second elevation angles $\alpha 2$ in all the second inclined surfaces R22 have the same value with one another, and the values are different from the first elevation angle $\alpha 1$ of the first reflection suppression segment 41. As such, at a fifth fixed point on a plane defined by the azimuth direction and the Z direction corresponding to those of the second reflection suppression segment 42, light from an incident light incident on the second reflection suppression segment 42 is visually recognized as reflected light which is different from reflected light emerged from the first reflection suppression segment 41. That is, reflected light emerging from the second reflection suppression segment 42 is visually recognized as light having a uniform brightness by an observer observing the display 40 from the fifth fixed point. Hereinafter, difference between reflected light emerged from the first inclined surfaces R21 of the first reflection suppression segment 41 and reflected light emerged from the second inclined surfaces R22 of the second reflection suppression segment 42 is described in more detail.

[State of Observing Display]

The state of observing the display 40 will be described with reference to FIG. 21 to FIG. 24.

Figure 21:
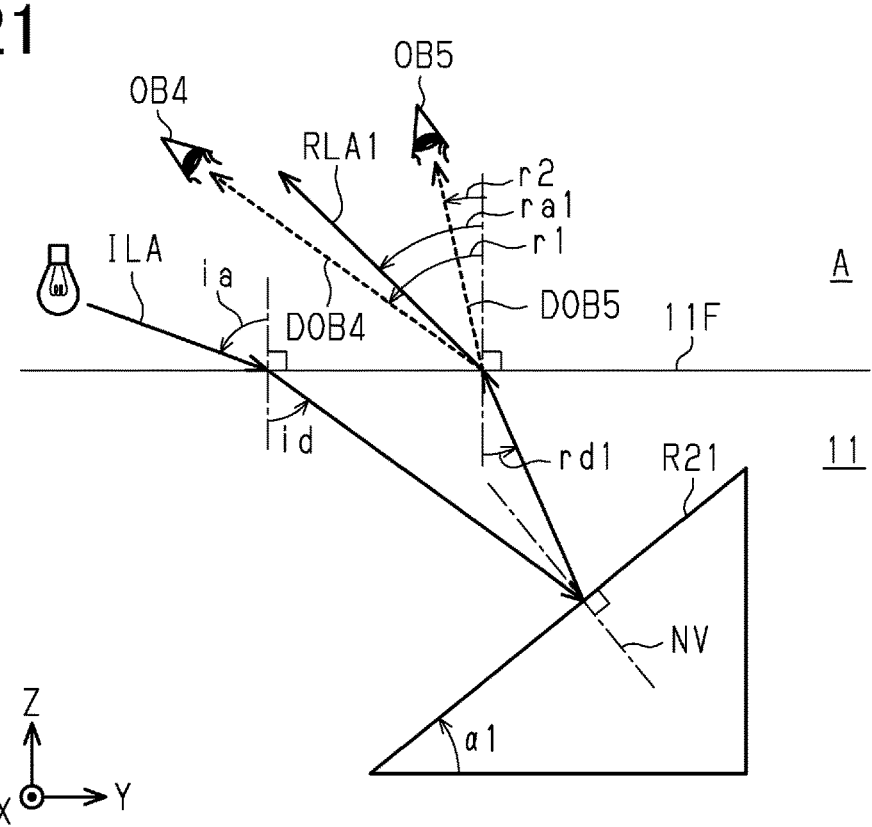
FIG. 21 is a conceptual diagram illustrating an interaction between the first reflection suppression segment and light according to the third embodiment of the present invention.
Figure 22:
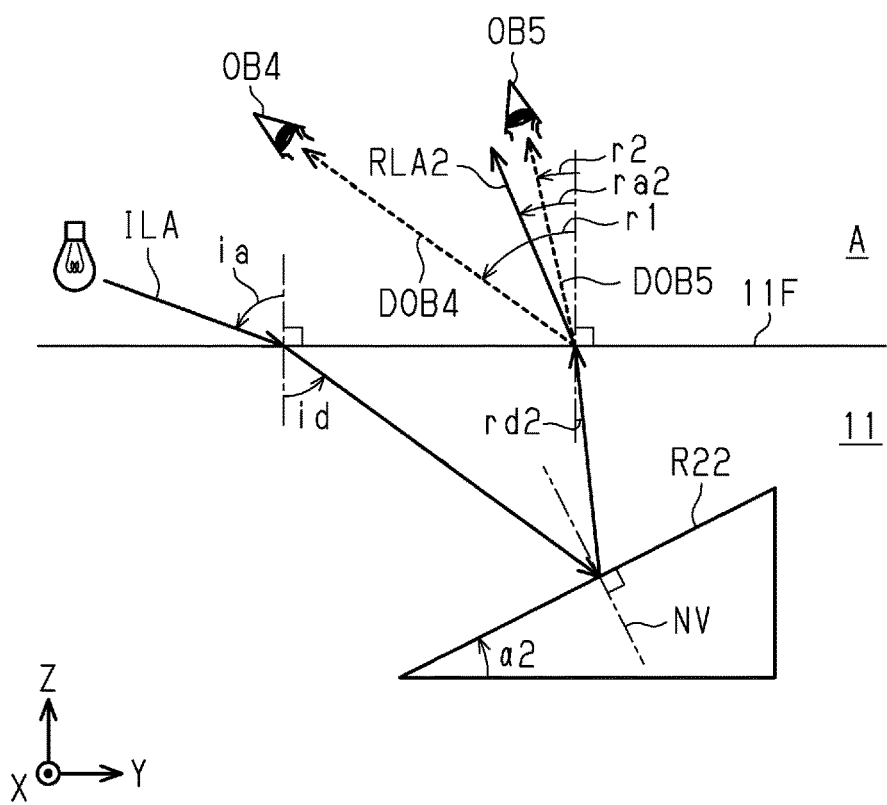
FIG. 22 is a conceptual diagram illustrating an interaction between the second reflection suppression segment and light according to the third embodiment of the present invention.

FIG. 21 shows an enlarged portion of the dielectric layer 11 in a cross-sectional structure along the Y-Z plane of the first reflection suppression segment 41. In FIG. 21, similarly to FIG. 2, for convenience of illustration, one first inclined surface R21 in the dielectric layer 11 is shown by one triangle. On the other hand, FIG. 22 shows an enlarged portion of the dielectric layer 11 in a cross-sectional structure along the Y-Z plane of the second reflection suppression segment 42. Similarly to FIG. 2 and FIG. 21, for the convenience of illustration, in FIG. 22, one second inclined surface R22 in the dielectric layer 11 is shown by one triangle. Hereinafter, the case in which air surrounds the dielectric layer 11, and the case in which an observer observes the flat surface 11F of the dielectric layer 11 from the side opposite to the embossed surface 11R will be described. Also hereinafter, for the purpose of explanation, FIG. 21 and FIG. 22 are concurrently referred.

As shown in FIG. 21, the angle formed between the first inclined surfaces R21 of the first reflection suppression segment 41 and the X-Y plane is the first elevation angle α1. As shown in FIG. 22, the angle formed between the second inclined surfaces R22 of the second reflection suppressing segment 42 and the X-Y plane is the second elevation angle α2 which is smaller than the first elevation angle α1.

As shown in each of FIG. 21 and FIG. 22, the incident light ILA incident on the display 40 is refracted at a refraction angle id when it is incident on the flat surface 11F at an incidence angle ia and travels through the dielectric layer 11 in both the first reflection suppression segment 41 and the second reflection suppression segment 42. In FIG. 21, the incident light that travels through a portion included in the first reflection suppression segment 41 in the dielectric layer 11 is reflected at the first inclined surfaces R21 having the first elevation angle α1, and is incident on the flat surface 11F at a first incidence angle rd1. By being refracted when traveling from the dielectric layer 11 to the air layer A, the incident light to the flat surface 11F emerges from the dielectric layer 11 as the first reflected light RLA1 at a first refraction angle ra1. On the other hand, in FIG. 22, the incident light that travels through a portion included in the second reflection suppression segment 42 in the dielectric layer 11 is reflected at the second inclined surfaces R22 having the second elevation angle α2, and is incident on the flat surface 11F at a second incidence angle rd2. The incident light is refracted when traveling from the dielectric layer 11 to the air layer A, and it emerges from the dielectric layer 11 as second reflected light RLA2 at a second refraction angle ra2.

As mentioned above, because the refraction angle id of the incident light ILA in the first reflection suppression segment 41 and that in the second reflection suppression segment 42 are equal to each other, the following Formula (17) is derived using the following Formula (12) derived from the first embodiment of the present invention.

$$id = 2\alpha - rd \quad (12)$$

$$2 \cdot \alpha 1 - rd1 = 2 \cdot \alpha 2 - rd2 \quad \text{Formula (17)}$$

As mentioned above, because the second elevation angle α2 is smaller than the first elevation angle α1, the second incidence angle rd2 is smaller than the first incidence angle rd1, based on Formula (17). Therefore, based on Formula (6) mentioned above, it is clear that the second refraction angle ra2 is smaller than the first refraction angle ra1.

In FIG. 21 and FIG. 22, a direction in which an angle formed by a normal line of the flat surface 11F is a first observation angle r1, is determined to be a fourth observation direction DOB4, and a fixed point on the fourth observation direction DOB4 is determined to be a fourth fixed point OB4. A direction in which an angle formed by a normal line of the flat surface 11F is a second observation angle r2, is determined to be a fifth observation direction DOB5, and a fixed point on the fifth observation direction DOB5 is determined to be a fifth fixed point OB5. The second observation angle r2 is smaller than the first observation angle r1.

Under illumination conditions in which general illumination such as natural light or fluorescent light is used as a light source, ambient light is distributed around the light source. A light flux amount of reflected light reflected towards a fixed point on the observation side and including ambient light is the largest when the observation angle matches the emergence angle of the reflected light, and the amount becomes smaller as the difference between the observation angle and the emergence angle of the reflected light increases.

The difference between the first observation angle r1 and the first refraction angle ra1 in FIG. 21 is smaller than the difference between the first observation angle r1 and the second refraction angle ra2 in FIG. 22. As such, the observer observing the display 40 from the fourth fixed point OB4 recognizes that the brightness of the first reflection suppression segment 41 is greater than that of the second reflection suppression segment 42. On the other hand, the difference between the second observation angle r2 and the first refraction angle ra1 in FIG. 21 is larger than the difference between the second observation angle r2 and the second refraction angle ra2 in FIG. 22. As such, the observer observing the display 40 from the fifth fixed point OB5 recognizes that the brightness of the second reflection suppression segment 42 is larger than that of the first reflection suppression segment 41.

Figure 23:
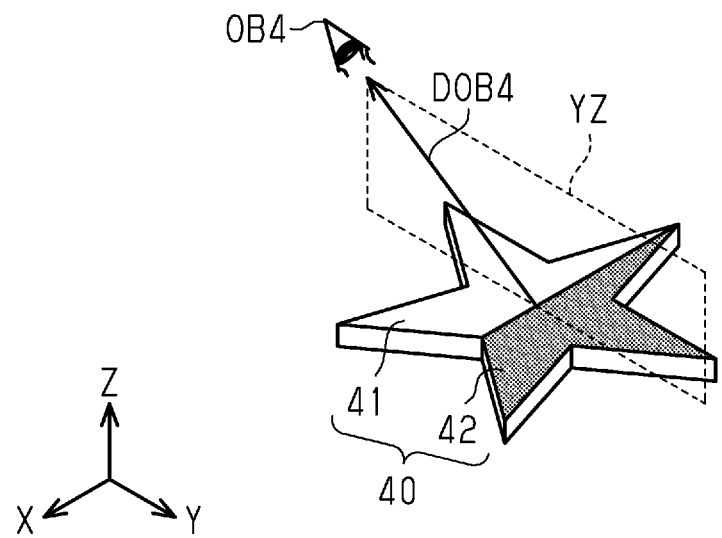
FIG. 23 is a conceptual diagram illustrating an observing state of the display according to the third embodiment of the present invention.

FIG. 23 schematically shows an image formed by reflected light that the display 40 emerges towards the fourth fixed point OB4, and FIG. 24 schematically shows an image formed by reflected light that the display 40 emerges towards the fifth fixed point OB5.

As shown in FIG. 23, the fourth fixed point OB4 is located on the Y-Z plane and is a point on the fourth observation direction DOB4 that forms plan view direction of the display 40 and first observation angle r1. That is, an observer is observing from a fixed point located on the left side of the paper with respect to the center of the display 40. At this time, the brightness of reflected light emerging from the first reflection suppression segment 41 towards the fourth fixed point OB4 is greater than the brightness of reflected light emerging from the second reflection suppression segment 42 towards the fourth fixed point OB4. Thereby, the first reflection suppression segment 41 and the second reflection suppression segment 42 display images having different brightness from each other towards the fourth fixed point OB4. As such, the observer of the display 40 visually distinguishes the difference between the first reflection suppression segment 41 and the second reflection suppression segment 42 at the fourth fixed point OB4.

On the other hand, as shown in FIG. 24, the fifth fixed point OB5 is located on the Y-Z plane and is a point on the fifth observation direction DOB5 that forms the second observation angle r2 with plan view direction of the display 40. That is, the observer observes from the left side with respect to the center of the display 40 in the paper, and closer to plan view direction with respect to the fourth fixed point OB4. At this time, the brightness of reflected light emerging from the second reflection suppression segment 42 towards the fifth fixed point OB5 is greater than the brightness of reflected light emerging from the first reflection suppression segment 41 towards the fifth fixed point OB5. Thereby, the first reflection suppression segment 41 and the second reflection suppression segment 42 display images having different brightness from each other towards the fifth fixed point OB5. As such, the observer of the display 40 visually distinguishes the difference between the first reflection suppression segment 41 and the second reflection suppression segment 42 at the fifth fixed point OB5.

By changing the fixed point from which the observer observes the display 40 between the fourth fixed point OB4 and the fifth fixed point OB5, it is possible to reverse the brightness order of the reflected light between the first reflection suppression segment 41 and the second reflection suppression segment 42. That is, the display 40 displays an image to the fifth fixed point OB5 that has a reversed relationship between the brightness of the first reflection suppression segment 41 and the brightness of the second reflection suppression segment 42 from the relationship therebetween in an image displayed towards the fourth fixed point OB4.

As described above, according to the display of the third embodiment, effects mentioned below are obtained in addition to the effects described in (1), (2) and (4) mentioned above.

(6) By changing the azimuth angle of the inclined surfaces for each of the reflection suppression segments 41 and 42, light having different brightness from each other is reflected from each of the reflection suppression segments 41 and 42 towards a fixed point located in the oblique direction of the display 40. Thereby, the display 40 displays a motif image formed by a plurality of regions having different brightness from one another towards the fixed point.

Modification of Third Embodiment of the Present Invention

The display 40 may include three or more types of reflection suppression segments having different azimuth angles from one another. A finer image can be displayed by using three or more types of reflection suppression segments having different elevation angles from one another. As a result, the display 40 enhances the counterfeit-resistance effect. Thus, different images are displayed from n fixed points by combining n types (n is a natural number of 2 or more) of reflection suppression segments having different sizes in elevation angles.

The display may include three or more reflection suppression segments arranged along one direction, and the elevation angle may continuously vary by a predetermined angle between reflection suppression segments adjoining each other. That is, the difference obtained by subtracting the elevation angle of the (n+1)th reflection suppression segment from the elevation angle of the nth reflection suppression segment may be a predetermined value. Accordingly, effects similar to the description (5) mentioned above are obtained.

Figure 25:
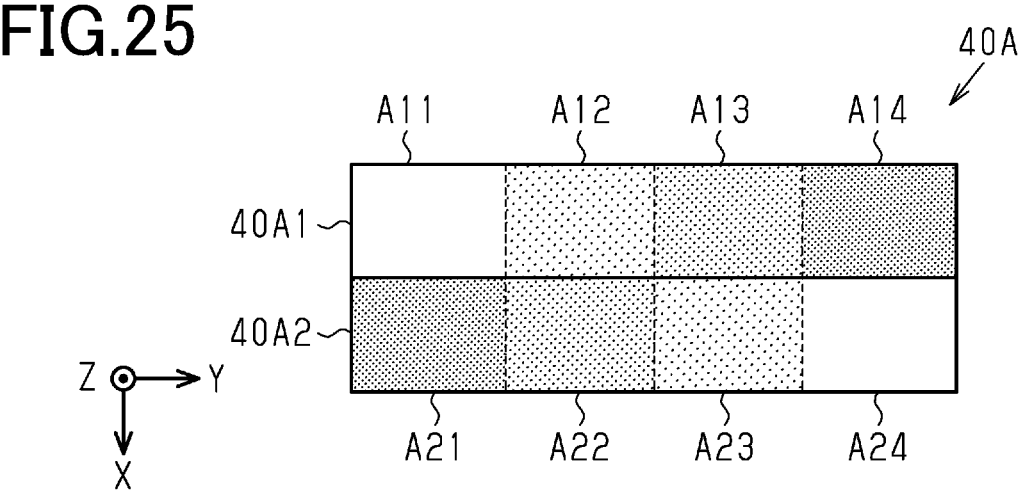
FIG. 25 is a conceptual diagram illustrating an observing state of a modified example of a display according to the third embodiment of the present invention.

As shown in FIG. 25, the display 40A including three or more reflection suppression segments arranged along one direction includes, for example, a first reflection suppression segment group 40A1 extending along the Y direction and a second reflection suppression segment group 40A2 extending along the Y direction. In the display 40A, the first reflection suppression segment group 40A1 and the second reflection suppression segment group 40A2 are adjacent to each other in the X direction. Each reflection suppression segment group includes a plurality of reflection suppression segments, and includes, for example, four reflection suppression segments. The first reflection suppression segment group 40A1 is composed of a first reflection suppression segment A11, a second reflection suppression segment A12, a third reflection suppression segment A13, and a fourth reflection suppression segment A14. These four reflection suppression segments are lined up along the Y direction without gaps. The second reflection suppression segment group 40A2 is composed of a first reflection suppression segment A21, a second reflection suppression segment A22, a third reflection suppression segment A23, and a fourth reflection suppression segment A24. These four reflection suppression segments are lined up along the Y direction without gaps.

The azimuth angles are the same in all the reflection suppression segments included in the display 40A. The azimuth angle in each reflection suppression segment is equal to the azimuth angle of the first reflection suppression segment 41 described above using FIG. 19. On the other hand, a plurality of types of regions having different elevation angles from one another are included in a plurality of reflection suppression segments. In the first reflection suppression segment group 40A1, the elevation angle of the first reflection suppression segment A11 is the largest, and the elevation angle of the fourth reflection suppression segment A14 is the smallest. In the first reflection suppression segment group 40A1, the elevation angles decrease by a predetermined angle, from the first reflection suppression segment A11 towards the fourth reflection suppression segment A14. In the second reflection suppression segment group 40A2, the elevation angle of the first reflection suppression segment A21 is the smallest, and the elevation angle of the fourth reflection suppression segment A24 is the largest. In the second reflection suppression segment group 40A2, the elevation angles increase by a predetermined angle, from the first reflection suppression segment A21 towards the fourth reflection suppression segment A24.

As such, when the observer observes the display 40A from a plane defined by the azimuth direction of each inclined surface included in each reflection suppression segment and the Z direction, by sequentially moving the observation angle at which the observer observes the display 40A, the reflection suppression segments having the highest brightness sequentially move in the first reflection suppression segment group 40A1 and the second reflection suppression segment group 40A2. In the first reflection suppression segment group 40A1 and the second reflection suppression segment group 40A2, the size of angles in the elevation angles is reversed with respect to the right and left directions of the paper. As such, in addition to the effect of sequentially moving the reflection suppression segments having the largest brightness in each of the first reflection suppression segment group 40A1 and the second reflection suppression segment group 40A2, a visual effect that the moving directions of the display regions are reversed from each other with respect to the right and left directions of the paper is obtained.

The configuration of the third embodiment of the present invention may also be implemented in combination with the composition of the second embodiment of the present invention. That is, a plurality of reflection suppression segments that the display includes may include two or more types of reflection suppression segments having azimuth angles and elevation angles that are both different from one another. According to such configuration, the display displays a more sophisticated image as compared to an image of a composition including two or more types of reflection suppression segments in which only the azimuth angles are different from one another, or a composition including two or more types of reflection suppression segments in which only the elevation angles are different from one another.

The display combining the configuration of the third embodiment of the present invention and the configuration of the second embodiment of the present invention may have the configuration described below with reference to FIG. 26 and FIG. 27.

Figure 26:
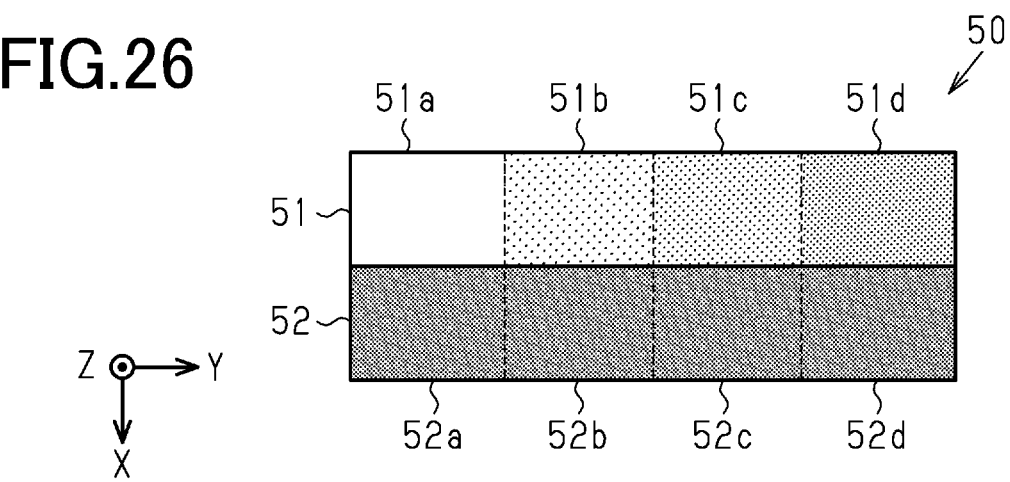
FIG. 26 is a conceptual diagram illustrating an observing state of a modified example of the display according to the third embodiment of the present invention.

As shown in FIG. 26, a display 50 includes a first reflection suppression segment group 51 extending along the Y direction and a second reflection suppression segment group 52 extending along the Y direction. In the display 50, the first reflection suppression segment group 51 and the second reflection suppression segment group 52 are adjacent to each other in the X direction. Each reflection suppression segment group includes a plurality of reflection suppression segments, and includes, for example, four reflection suppression segments. The first reflection suppression segment group 51 is composed of a first reflection suppression segment 51a, a second reflection suppression segment 51b, a third reflection suppression segment 51c, and a fourth reflection suppression segment 51d. These four reflection suppression segments are lined up along the Y direction without gaps. The second reflection suppression segment group 52 is composed of a first reflection suppression segment 52a, a second reflection suppression segment 52b, a third reflection suppression segment 52c, and a fourth reflection suppression segment 52d. These four reflection suppression segments are lined up along the Y direction without gaps.

The azimuth angles are different from each other between the first reflection suppression segment group 51 and the second reflection suppression segment group 52. While the azimuth angle of each inclined surface included in the first reflection suppression segment group 51 is equal to the azimuth angle of the first inclined surface R11 described above with reference to FIG. 7, the azimuth angle of an inclined surface included in the second reflection suppression segment group 52 is equal to the azimuth angle of the second inclined surface R12 described above with reference to FIG. 8. That is, the azimuth angle of each inclined surface included in the first reflection suppression segment group 51 and the azimuth angle of each inclined surface included in the second reflection suppression segment group 52 are different by 180°.

On the other hand, between the four reflection suppression segments included in the first reflection suppression segment group 51, the elevation angles are different from one another. In the first reflection suppression segment group 51, the elevation angle of the first reflection suppression segment 51a is the largest, and the elevation angle of the fourth reflection suppression segment 51d is the smallest. In the first reflection suppression segment group 51, the elevation angles each decrease by a predetermined angle, from the first reflection suppression segment 51a towards the fourth reflection suppression segment 51d. In the second reflection suppression segment group 52, the elevation angle of the first reflection suppression segment 52a is the smallest and the elevation angle of the fourth reflection suppression segment 52d is the largest. In the second reflection suppression segment group 52, the elevation angle each increase by a predetermined angle, from the first reflection suppression segment 52a towards the fourth reflection suppression segment 52d.

As such, for example, when the observer observes the display 50 from a plane defined by the azimuth direction and the Z direction of each inclined surface included in the reflection suppression segment of the first reflection suppression segment group 51, by sequentially moving the observation angle at which the observer observes the display 50, the brightness in the display 50 varies as follows. That is, in the first reflection suppression segment group 51, the reflection suppression segment having the largest brightness moves sequentially between the first reflection suppression segment 51a and the fourth reflection suppression segment 51d. On the other hand, the second reflection suppression segment group 52 is visually recognized as an image darker than any images of the reflection suppression segments included in the first reflection suppression segment group 51.

Figure 27:
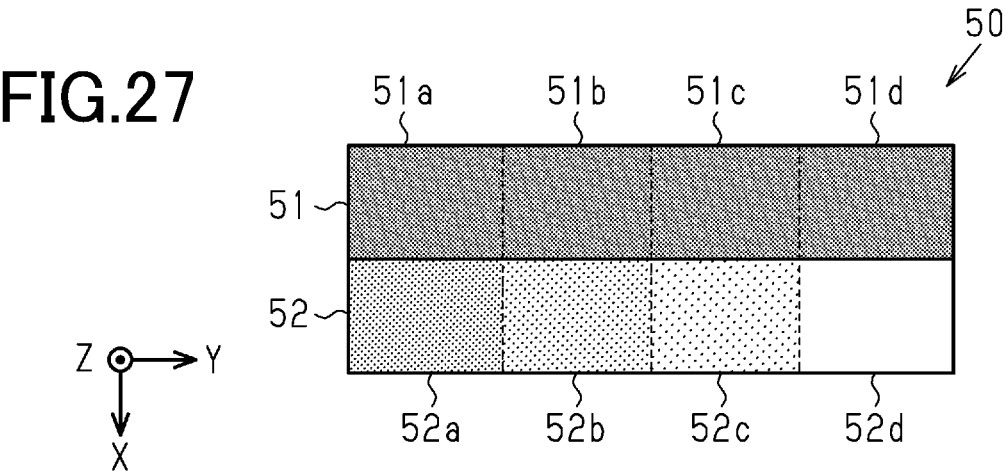
FIG. 27 is a conceptual diagram illustrating an observing state of a modified example of the display according to the third embodiment of the present invention.

On the other hand, as shown in FIG. 27, when the observer observes the display 50 from a plane defined by the azimuth direction and the Z direction of each inclined surface included in a reflection suppression segment of the second reflection suppression segment group 52, by sequentially moving the observation angle at which the observer observes the display 50, the brightness of the display 50 varies as follows. That is, in the second reflection suppression segment group 52, the reflection suppression segment having the highest brightness sequentially moves between the first reflection suppression segment 52a and the fourth reflection suppression segment 52d. On the other hand, the first reflection suppression segment group 51 is visually recognized as an image darker than any images of the reflection suppression segments included in the second reflection suppression segment group 52.

In the display 50 shown in FIG. 27, as viewed perpendicular to the direction in which the display 50 is located, reflection suppression segments in which both the azimuth angles and the elevation angles are different from one another are independently located. Moreover, in the display, as viewed perpendicular to a plane in which the display is located, regions including reflection suppression segments in which both the azimuth angles and the elevation angles are different may overlap with one another at least in portion of each region.

Figure 28:
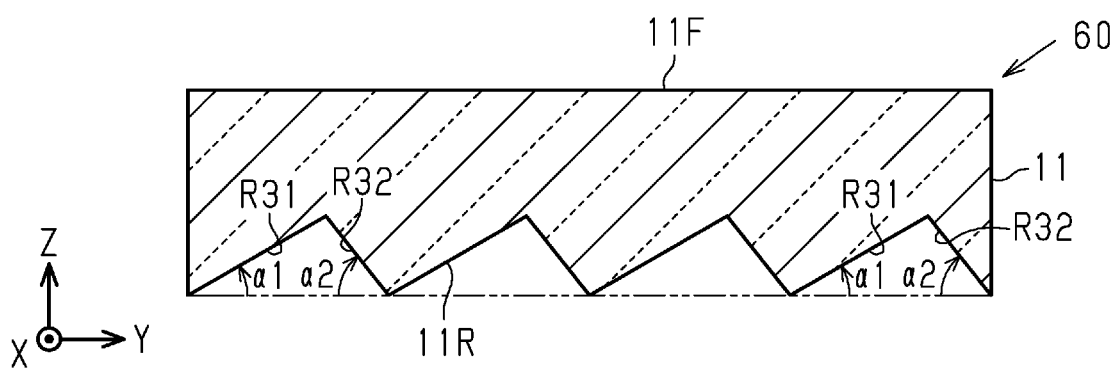
FIG. 28 is a conceptual cross-sectional view illustrating a structure of a modified example of the display according to the third embodiment of the present invention.

That is, as shown in FIG. 28, in a display 60, a first inclined surface R31 and a second inclined surface R32 are alternately arranged in a cross-section along the YZ plane in the Y direction, and the first inclined surface R31 and the second inclined surface R32 adjoining each other may repeat themselves. The first elevation angle α1 of the first inclined surface R31 and the second elevation angle α2 of the second inclined surface R32 are different from each other. Accordingly, as viewed perpendicular to a plane in which the display 60 is located, a region in which a plurality of the first inclined surfaces R31 are located and a region in which a plurality of the second inclined surfaces R32 are located overlap with each other at least in a portion of each region.

The display 40 of the third embodiment of the present invention and modification of the display of the third embodiment of the present invention may be counterfeit resistant media resistant to counterfeiting, for passports and ID cards, similar to the reflection suppression segment 10 mentioned above. Alternatively, the display may be a medium to enhance designability of articles having the display, and the display itself may be a target to be observed.

The first embodiment and its modifications, the second embodiment and its modifications, and the third embodiment and its modifications of the present invention may be combined. A synergistic benefit is obtained by the combination.

REFERENCE SIGNS LIST 10, 10A, 10B, 10C . . . Reflection suppression segment; 11 . . . Dielectric layer; 11F, 21F, 22F . . . Flat surface; 11R, 21R, 22R . . . Embossed surface; 11R1 . . . Inclined surface; 12 . . . Reflection layer; 13 . . . Adhesive layer; 14 . . . Adherend; 21 . . . First dielectric layer; 22 . . . Second dielectric layer; 30, 30A, 40, 40A, 50, 60 . . . display; 31, 41, 51a, 52a, A11, A21 . . . First reflection suppression segment; 32, 42, 51b, 52b, A12, A22 . . . Second reflection suppression segment; 40A1, 51 . . . First reflection suppression segment group; 40A2, 52 . . . Second reflection suppression segment group; 51c, 52c, A13, A23 . . . Third reflection suppression segment; 51d, 52d, A14, A24 . . . Fourth reflection suppression segment; A . . . Air layer; DP . . . diffuser; OB1 . . . First fixed point; OB2 . . . Second fixed point; OB3 . . . Third fixed point; OB4 . . . Fourth fixed point; OB5 . . . Fifth fixed point; R11, R21, R31 . . . First inclined surface; R12, R22, R32 . . . Second inclined surface.

What is claimed is:

1. A reflection suppression segment provided with a dielectric layer, comprising:
an embossed surface and a flat surface which is on a side opposite to the embossed surface, wherein:
a plane that approximates the flat surface is an X-Y plane;
a normal direction to the X-Y plane is a Z direction;
the embossed surface has inclined surfaces that are inclined with respect to the Z direction;
the inclined surfaces reflect incident light incident on the dielectric layer and emerge reflected light; and
an elevation angle, which is an angle between the inclined surface and the X-Y plane, is α, and a refractive index of the dielectric layer is n, which satisfy Formula (1): $\sin \alpha \leq (1/n) < \sin 2\alpha$, wherein the reflection suppression segment is further provided with a reflection layer on the inclined surfaces and wherein the reflection layer comprises at least one of a metal, a metal alloy, a metal sulfide, a metal oxide, and a metal fluoride and wherein the reflection layer covers the embossed surface entirely and wherein a thickness of the reflection layer on portions of the embossed layer, which are other than the inclined surfaces, is thinner than a thickness of the reflection layer on the inclined surfaces.

2. The reflection suppression segment of claim 1, wherein:
the refractive index of the dielectric layer is more than 1.0 and 2.0 or less.

3. The reflection suppression segment of claim 1, wherein:
the dielectric layer is a first dielectric layer;
the reflection suppression segment is further provided with a second dielectric layer covering the embossed surface of the first dielectric layer; and
a surface opposite to the embossed surface in the second dielectric layer is flat.

4. The reflection suppression segment of claim 1, wherein the reflection layer comprises a metal or a metal alloy.

5. The reflection suppression segment of claim 1, wherein the reflection layer comprises a metal.

6. The reflection suppression segment of claim 5, wherein the metal is selected from aluminum, gold, silver, platinum, nickel, tin, chromium, and zirconium.

7. The reflection suppression segment of claim 1, wherein the reflection layer comprises a metal sulfide.

8. The reflection suppression segment of claim 1, wherein the reflection layer comprises a metal oxide.

9. The reflection suppression segment of claim 1, wherein the reflection layer comprises a metal fluoride.

10. The reflection suppression element of claim 1, wherein the reflection layer is a multilayer.

11. The reflection suppression element of claim 1, wherein the reflection layer is a single layer.

12. A display provided with a plurality of reflection suppression segments, wherein:
each reflection suppression segment is the reflection suppression segment of claim 1;
the plurality of reflection suppression segments share a dielectric layer, the flat surface of each reflection suppression segment is included in a flat surface in the dielectric layer, and the embossed surface of each reflection suppression segment is included in a embossed surface in the dielectric layer;
when the display is observed from a predetermined fixed point located on a side of the flat surface of the dielectric layer facing away from the embossed surface of the dielectric layer, and located in an oblique direction with respect to the flat surface of the dielectric layer, the plurality of reflection suppression segments includes the reflection suppression segments having different brightness of reflected light from one another.

13. A method of verifying the display of claim 12, comprising:
observing the display in a state of stacking a diffuser on the flat surface of the display; and
observing the display in a state of not stacking the diffuser on the flat surface of the display.

14. The display of claim 12, wherein:
the plurality of reflection suppression segments have different elevation angles from one another, and thereby, when the display is observed from the fixed point, the brightness between the reflection suppression segments are different.

15. The display of claim 14, wherein:
the display comprises three or more of the reflection suppression segments arranged along one direction; and
a difference obtained by subtracting an elevation angle of an (n+1)th reflection suppression segment from an elevation angle of an nth reflection suppression segment is a predetermined value.

16. The display of claim 12, wherein:
a direction defined by projecting a normal direction of the inclined surfaces onto the X-Y plane is an azimuth direction;
an angle formed between the azimuth direction and a reference direction in the X-Y plane is an azimuth angle; and
the plurality of reflection suppression segments have different azimuth angles, and thereby, when the display is observed from the fixed point, the brightness is different between the reflection suppression segments.

17. The display of claim 16, wherein:
the display comprises three or more of the reflection suppression segments arranged along one direction; and
a difference obtained by subtracting an azimuth angle of an (n+1)th reflection suppression segment from an azimuth angle of an nth reflection suppression segment is of a predetermined value.

* * * * *